US 11,993,743 B2

(12) United States Patent
Liu et al.

(10) Patent No.: US 11,993,743 B2
(45) Date of Patent: May 28, 2024

(54) DOUBLE-CHAMBER MICROCAPSULE FOR DRILLING FLUID AND SELF-REVERSING REVERSIBLE WATER-IN-OIL DRILLING FLUID AND PREPARATION METHOD THEREOF

(71) Applicant: Southwest Petroleum University, Chengdu (CN)

(72) Inventors: Lu Liu, Chengdu (CN); Xiaolin Pu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/328,552

(22) Filed: Jun. 2, 2023

(65) Prior Publication Data
US 2023/0357623 A1    Nov. 9, 2023

Related U.S. Application Data

(63) Continuation of application No. PCT/CN2022/116752, filed on Sep. 2, 2022.

(51) Int. Cl.
C09K 8/36 (2006.01)
B01J 13/04 (2006.01)
B01J 13/20 (2006.01)

(52) U.S. Cl.
CPC ............... *C09K 8/36* (2013.01); *B01J 13/04* (2013.01); *B01J 13/206* (2013.01)

(58) Field of Classification Search
CPC . C09K 8/36; C09K 8/516; C09K 8/035; B01J 13/04; B01J 13/206
See application file for complete search history.

(56) References Cited

FOREIGN PATENT DOCUMENTS

| CN | 108366970 A | * | 8/2018 | ............. A61K 31/01 |
| CN | 108525618 A | * | 9/2018 | ............. B01J 13/02 |
| CN | 111558349 B | * | 11/2021 | ............. B01J 13/046 |

* cited by examiner

*Primary Examiner* — Kumar R Bhushan
(74) *Attorney, Agent, or Firm* — Calfee, Halter & Griswold LLP

(57) ABSTRACT

A double-chamber microcapsule includes a capsule core and a microcapsule wall encapsulating the capsule core, wherein the microcapsule wall is a thermo-sensitive polymer encapsulating the content of a second chamber; the capsule core is a pH responsive polymer encapsulating the content of a first chamber, the pH responsive polymer is obtained by polymerizing a pH responsive monomer and a cross-linking monomer; the content of the first chamber is different from the content of the second chamber, each is selected from a solid acid or a solid alkali.

10 Claims, 4 Drawing Sheets under the conditions of introducing nitrogen gas and removing oxygen gas, then removing the solvent, precipitating and filtering the reaction product, and obtaining a macroinitiator;

DOUBLE-CHAMBER MICROCAPSULE FOR DRILLING FLUID AND SELF-REVERSING REVERSIBLE WATER-IN-OIL DRILLING FLUID AND PREPARATION METHOD THEREOF

CROSS REFERENCE TO RELATED APPLICATION

This application is a bypass continuation application of a PCT Application under PCT/CN2022/116752, filed on Sep. 2, 2022, which claims priority of the Chinese Patent Application No. 202210432998.7, filed on Apr. 24, 2022, which are incorporated herein by reference in their entireties.

FIELD

The present disclosure relates to the technical field of drilling fluid, in particular to a double-chamber microcapsule for drilling fluid and a self-reversing reversible water-in-oil drilling fluid and a preparation method thereof.

BACKGROUND

The existing water-in-oil drilling fluids generally have high emulsion stability and high oil wettability, and can produce high oil wettability for the rock debris, drill string, and formations in contact with the continuous oil phase, and avoid a series of well drilling problems caused by the water-sensitive shale destabilization due to a use of water-based drilling fluids. However, the existing oil-based drilling fluids may bring forth a series of subsequent problems, such as changes in wettability of formations and rock debris, difficulty in removing mud cakes, reduced well cementation bonding strength, plugging of formations caused by an emulsion, oil-containing rock debris cannot be easily disposed and require the high processing costs. As a result, the oil-based drilling fluids have a trade off in drilling efficiency versus the problems in the oil and gas well productivity and existing protection, the problems not only impede the widespread use of oil-based drilling fluids, but also significantly impact the profit of oil and gas resources exploration and development. In our current researches on the practical use cases of drilling fluids in foreign countries, the reversible emulsified drilling fluid system has insufficient temperature resistance and low density, cannot meet the technical requirements of oil and gas drilling operations in the high temperature and high pressure deep wells and ultra-deep wells. The reversible emulsified drilling fluid in China is still in its infancy and has a large gap from the research results in foreign countries. The current reversible emulsified drilling system applied in China utilizes a strong acid and/or a strong alkali as a stimulation condition, presents a number of problems in corrosion of pipes and tubular columns, safety of storage, transportation and operations, and increases difficulty and costs of operations, and further decreases the availability of the system in the field. Therefore, the current realistic problem in front of us that shall be urgently solved is how to increase the temperature resistance and density of the reversible drilling fluid while maintaining the stability, filtrate loss amount, demulsification and other properties of the reversible drilling fluid.

SUMMARY

In order to overcome the problems in the existing art, the present disclosure provides a double-chamber microcapsule for drilling fluid and a self-reversing reversible water-in-oil drilling fluid and a preparation method thereof. The technical solutions of the present disclosure is as follows:

In a first aspect, the present disclosure provides a double-chamber microcapsule for drilling fluid comprising a capsule core and a microcapsule wall encapsulating the capsule core, and the microcapsule wall is a thermo-sensitive polymer encapsulating the content of a second chamber; the capsule core is a pH responsive polymer encapsulating the content of a first chamber, the pH responsive polymer is obtained by polymerizing a pH responsive monomer and a cross-linking monomer; the content of the first chamber is different from the content of the second chamber, each is selected from a solid acid or a solid alkali.

In a second aspect, the present disclosure provides a method of preparing a double-chamber microcapsule for drilling fluid comprising:

(1) contacting a solid acid or a solid alkali with a mixed solution containing paraffin, a curing agent and a first solvent, and subjecting the obtained solid to filtering, washing, vacuum drying and pulverization treatment; and obtaining a pre-encapsulated solid acid or a pre-encapsulated solid alkali;

(2) dropwise adding the pre-encapsulated solid acid to an aqueous solution of thermo-sensitive polymer under the ultrasonic conditions, and subjecting the obtained product to dialysis with deionized water, filtration separation and freeze-drying treatment; and obtaining a thermo-sensitive polymer nanoparticles encapsulated with solid acid;

or dropwise adding the pre-encapsulated solid alkali to an aqueous solution of thermo-sensitive polymer, and subjecting the obtained product to dialysis with deionized water, filtration separation, and freeze-drying treatment; and obtaining a thermo-sensitive polymer nanoparticles encapsulated with solid alkali;

(3) contacting an initiator, a catalyst, a complexing agent and an initiating monomer with a second solvent and carrying out reaction under the conditions of introducing nitrogen gas and removing oxygen gas, then removing the solvent, precipitating and filtering the reaction product, and obtaining a macroinitiator;

(4) contacting the pH responsive monomer, a cross-linking monomer and the pre-encapsulated solid alkali with an oil phase and carry out reaction in the presence of the macroinitiator, a catalyst and a complexing agent, and obtaining a prepolymer mixed solution encapsulated with solid alkali;

or contacting the pH responsive monomer, a cross-linking monomer and the pre-encapsulated solid acid with an oil phase and carry out reaction in the presence of the macroinitiator, a catalyst and a complexing agent, and obtaining a prepolymer mixed solution encapsulated with solid acid;

(5) contacting the thermo-sensitive polymer nanoparticles encapsulated with solid acid with the prepolymer mixed solution encapsulated with solid alkali and carrying out an ultrasonic emulsification reaction under the stirring condition;

or contacting the thermo-sensitive polymer nanoparticles encapsulated with solid alkali with the prepolymer mixed solution encapsulated with solid acid and carrying out an ultrasonic emulsification reaction; and obtaining a double-chamber microcapsule.

In a third aspect, the present disclosure provides a double-chamber microcapsule prepared with the aforementioned method.

In a fourth aspect, the present disclosure provides a self-reversing reversible water-in-oil drilling fluid comprising the aforementioned double-chamber microcapsule.

In a fifth aspect, the present disclosure provides a method of preparing the self-reversing reversible water-in-oil drilling fluid comprising:

adding a double-chamber microcapsule containing a solid alkali as the content of a first chamber into a drilling fluid, performing a temperature rise treatment, the nanometer thermo-sensitive polymer nanoparticles at a surface of the double-chamber microcapsule release solid acid, which automatically adjusts a pH of the emulsion to a range of 1-7, the emulsion is reversed to an oil-in-water drilling fluid; further subjecting the drilling fluid to a stirring treatment, the capsule core of the double-chamber microcapsule releases the solid alkali, so that the emulsion is reversed to a water-in-oil drilling fluid;

and/or, adding the double-chamber microcapsule containing a solid acid as the content of a first chamber into a drilling fluid, performing a temperature rise treatment, the nanometer thermo-sensitive polymer nanoparticles at a surface of the double-chamber microcapsule release solid alkali, which automatically adjusts a pH of the emulsion to a range of 6-12, the emulsion is reversed to a water-in-oil drilling fluid; further subjecting the drilling fluid to a stirring treatment, the capsule core of the double-chamber microcapsule releases the solid acid, so that the emulsion is reversed to an oil-in-water drilling fluid.

The double-chamber microcapsule for drilling fluid and the self-reversing reversible water-in-oil drilling fluid of the present disclosure produce the following favorable effects:

Firstly, the double-chamber microcapsule of the present disclosure has a simple and controllable reversion method, can delay reversing of the drilling fluid for a certain time period. The preparation method of double-chamber microcapsule is simple, the microcapsule can control the extended release time of the capsule core by initially controlling the temperature and releasing the acid/alkali. It is also possible to release the capsule core first by using a small amount of acid/alkali and then adjusting the temperature to release the acid/alkali encapsulated in the Pickering nanometer emulsifier. The safety issue of the direct use of an acid or alkali during storage is greatly improved, and the corrosion of the tubular wall and vessel by strong acid and alkali is alleviated.

Secondly, the double-chamber microcapsule of the present disclosure is preset in the drilling fluid and participates the formation of the filter cakes, it is conducive to maintaining stability of the borehole wall during the process of disposing downward and controlling the completion string. At a subsequent stage, the slow release of capsule core can remove the filter cakes and alleviate plugging, can effectively avoids the formation of lost circulation bands caused by alleviating plugging with a strong acid and dissolution of pores resulting from local acid etching, and lost circulation of the subsequent cleaning fluid. The time period for the delayed removal of the filter cakes is greater than 8 hours, the time required for complete reversal is less than 40 minutes, the complete removal efficiency of filter cakes is greater than 96%.

Thirdly, the drilling fluid of the present disclosure has a directly adjustable density within a range of 1.0 g/cm$^3$ to 2.2 g/cm$^3$, exhibits desirable rheology within a temperature range of 100-180° C., and has a low filtrate loss and a desired suspension stability, and the sedimentation of a weighting material and the demulsification phenomenon do not occur. The temperature controlled self-reversing drilling fluid of the present disclosure has good stability, a demulsification voltage greater than 400V, and a continuous phase extraction rate lower than 10%; the high temperature aging does not affect smooth reversal of the emulsion and stabilization of the emulsion; the drilling fluid can be reversed into an oil-in-water drilling fluids by using an acid/alkali response, a demulsification voltage is within a range of 0V to 20V, the water-in-oil drilling fluid and the oil-in-water drilling fluid have comparable properties, the high temperature and high pressure filtrate loss amounts is less than 10 mL. The drilling fluid has the properties of multiple reversibility and the reversal at a delayed and controllable time.

Fourthly, the temperature control drilling fluid of the present disclosure has a useful effect of delaying the reversal by controlling the capsule wall composition, facilitating self-reversal of the drilling fluid within the wellbore. The reversible phases of the emulsion in different borehole horizons are achieved by taking advantage of the temperature conditions within the wellbore.

DETAILED DESCRIPTION

Figure 1:
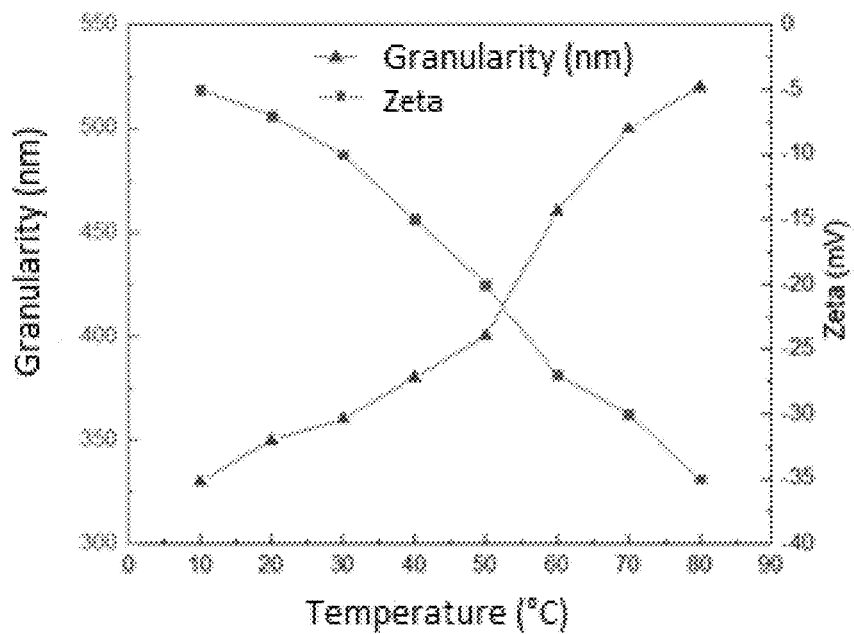
FIG. 1 is an influence curve showing the effect of temperature on the granularity and zeta potential of the double-chamber microcapsule in Example 1 of the present disclosure.

As previously mentioned, a first aspect of the present disclosure provides a double-chamber microcapsule for drilling fluid comprising a capsule core and a microcapsule wall encapsulating the capsule core, and the microcapsule wall is a thermo-sensitive polymer encapsulating the content of a second chamber; the capsule core is a pH responsive polymer encapsulating the content of a first chamber, the pH responsive polymer is obtained by polymerizing a pH responsive monomer and a cross-linking monomer; the content of the first chamber is different from the content of the second chamber, each is selected from a solid acid or a solid alkali.

According to the present disclosure, the microcapsule wall has a thickness within a range of 100 nm-0.5 cm, and the capsule core has a thickness within a range of 300 nm-1 cm; preferably, the microcapsule wall has a thickness within a range of 20 μm-0.1 cm, the capsule core has a thickness within a range of 20 μm-0.5 cm.

According to the present disclosure, a weight ratio of the used amount of the capsule core to the microcapsule wall is (80-30):(20-70), preferably (60-40):(40-60), based on the total weight of the double-chamber microcapsule.

According to the present disclosure, the solid acid is one or more selected from the group consisting of solid hydrochloric acid, solid nitric acid, solid oxalic acid, solid phosphoric acid and solid sulfonic acid.

According to the present disclosure, the solid alkali is one or more selected from the group consisting of lithium hydroxide, sodium hydroxide and potassium hydroxide.

In accordance with the present disclosure, the thermo-sensitive polymer is one or more selected from the group consisting of poly(N-isopropylacrylamide), poly(N,N-diethylacrylamide) and poly(2-carboxy-N-isopropylamide).

According to the present disclosure, the pH responsive monomer is one or more selected from the group consisting of N' N-dimethylaminoethyl methacrylate, acrylic acid and methacrylic acid.

According to the present disclosure, the cross-linking monomer is one or more selected from the group consisting of isodecyl acrylate, laurate acrylate, 1,6-hexanediol diacrylate, trimethylolpropane triacrylate, ethylene glycol dimethacrylate, trimethylolpropane trimethacrylate and propylene glycol diacrylate.

In a second aspect, the present disclosure provides a method of preparing a double-chamber microcapsule for drilling fluid comprising:

(1) contacting a solid acid or a solid alkali with a mixed solution containing paraffin, a curing agent and a first solvent, and subjecting the obtained solid to filtering, washing, vacuum drying and pulverization treatment; and obtaining a pre-encapsulated solid acid or a pre-encapsulated solid alkali;

(2) dropwise adding the pre-encapsulated solid acid to an aqueous solution of thermo-sensitive polymer under the ultrasonic conditions, and subjecting the obtained product to dialysis with deionized water, filtration separation and freeze-drying treatment; and obtaining a thermo-sensitive polymer nanoparticles encapsulated with solid acid;

or dropwise adding the pre-encapsulated solid alkali to an aqueous solution of thermo-sensitive polymer, and subjecting the obtained product to dialysis with deionized water, filtration separation, and freeze-drying treatment; and obtaining a thermo-sensitive polymer nanoparticles encapsulated with solid alkali;

(3) contacting an initiator, a catalyst, a complexing agent and an initiating monomer with a second solvent and carrying out reaction under the conditions of introducing nitrogen gas and removing oxygen gas, then removing the solvent, precipitating and filtering the reaction product, and obtaining a macroinitiator;

(4) contacting the pH responsive monomer, a cross-linking monomer and the pre-encapsulated solid alkali with an oil phase and carry out reaction in the presence of the macroinitiator, a catalyst and a complexing agent, and obtaining a prepolymer mixed solution encapsulated with solid alkali;

or contacting the pH responsive monomer, a cross-linking monomer and the pre-encapsulated solid acid with an oil phase and carry out reaction in the presence of the macroinitiator, a catalyst and a complexing agent, and obtaining a prepolymer mixed solution encapsulated with solid acid;

(5) contacting the thermo-sensitive polymer nanoparticles encapsulated with solid acid with the prepolymer mixed solution encapsulated with solid alkali and carrying out an ultrasonic emulsification reaction under the stirring condition;

or contacting the thermo-sensitive polymer nanoparticles encapsulated with solid alkali with the prepolymer mixed solution encapsulated with solid acid and carrying out an ultrasonic emulsification reaction; and obtaining a double-chamber microcapsule.

According to the present disclosure, the paraffin in step (1) is one or more selected from the group consisting of 50 #paraffin wax, 60 #paraffin wax, 70 #paraffin wax, 80 #paraffin wax, polyethylene wax, EVA wax and PP wax.

According to the present disclosure, the solid acid is one or more selected from the group consisting of solid hydrochloric acid, solid nitric acid, solid oxalic acid, solid phosphoric acid and solid sulfonic acid.

According to the present disclosure, the solid alkali is one or more selected from the group consisting of lithium hydroxide, sodium hydroxide and potassium hydroxide.

According to the present disclosure, the curing agent is one or more selected from the group consisting of organosilicone epoxy resin, polyurethane, acrylic resin, ethylcellulose, melamine formaldehyde resin and polystyrene.

According to the present disclosure, the first solvent is selected from cyclohexane and/or toluene.

According to the present disclosure, a ratio of the parts by weight of the used amount of the solid acid or solid alkali, the paraffin wax, the curing agent to the first solvent is (10-50):(30-50):(10-30):(100-500).

According to the present disclosure, in the step (1), the contacting conditions in step (1) comprise a temperature of 70-110° C. and an ultrasonic dispersion for 30 min-2 h.

According to the present disclosure, the thermo-sensitive polymer in step (2) is one or more selected from the group consisting of poly(N-isopropylacrylamide) (PNIPAM), poly(N,N-diethylacrylamide) and poly(2-carboxy-N-isopropylamide).

According to the present disclosure, a ratio of parts by weight of the used amount of the pre-encapsulated solid acid or the pre-encapsulated solid alkali, the thermo-sensitive polymer to water is (10-40):(10-30):(100-300).

According to the present disclosure, the ultrasonic dispersion in step (2) is carried out for a time of 30 min to 2 h, and the filtration separation is performed for a time of 3 to 6 h.

In accordance with the present disclosure, in step (3), the initiator is one or more selected from the group consisting of 1-PECI-(1-chloro-1-phenylethane), 2-bromoisobutyrylbromide, 2-(2-bromopropionyloxy)-ethyl acrylate, 2-(2-bromoisobutoxy)-ethyl methacrylate.

According to the present disclosure, the catalyst is a transition metal halide, preferably $CuBr_2$, $CuCl$ or $CuI_2$.

According to the present disclosure, the complexing agent is one or more selected from the group consisting of bipyridine, N,N,N,N,N-pentamethyldiethylenetriamine (PMDTETA), 1,1,4,7,10,10-hexamethyltriethylenetetramine (HMTETA) and 2-pyridinecarboxaldehyde n-propylamine.

According to the present disclosure, the initiating monomer is one or more selected from the group consisting of 4-vinylbenzene polyacid, methyl acrylate, tert-butyl acrylate (tBA) and 2-succinyloxyethyl methacrylate.

According to the present disclosure, the second solvent is one or more selected from the group consisting of acetone, methanol, isopropanol, diethyl ether and tetrahydrofuran.

According to the present disclosure, a ratio of the parts by weight of the initiator, the catalyst, the complexing agent, the initiating monomer to the second solvent is (0.1-2):(0.01-2):(0.1-3):(0.1-10):(100-300).

According to the present disclosure, the reaction conditions in step (3) comprise a temperature within the range of 60-100° C. and a time of 6-8 h.

According to the present disclosure, the pH responsive monomer in step (4) is one or more selected from the group consisting of N' N-dimethylaminoethyl methacrylate (DMAEMA), acrylic acid and methacrylic acid.

According to the present disclosure, the cross-linking monomer is one or more selected from the group consisting of isodecyl acrylate, laurate acrylate, 1,6-hexanediol diacrylate (HDDA), trimethylolpropane triacrylate, ethylene glycol dimethacrylate, trimethylolpropane trimethacrylate and propylene glycol diacrylate.

According to the present disclosure, the oil phase is one or more selected from the group consisting of dodecane, n-hexane, cyclopentane, tetradecyl, n-heptane and octane.

According to the present disclosure, a ratio of the parts by weight of the used amounts of the macroinitiator, the catalyst, the complexing agent, the pH responsive monomer, the cross-linking monomer, the pre-encapsulated solid alkali or the pre-encapsulated solid acid, and the oil phase is (3-10):(0.01-2):(0.1-4):(5-30):(1-8):(5-20):(100-300).

According to the present disclosure, the reaction conditions in step (4) comprise a temperature within a range of 30-60° C. and a time of 0.5-2 h.

According to the present disclosure, a ratio of the parts by weight of the used amounts of the thermo-sensitive polymer nanoparticles encapsulated with solid acid to the oil phase in step (5) is (50-150):(100-300).

According to the present disclosure, the ultrasonic emulsification reaction conditions comprise: the ultrasonic emulsification is performed at a stirring rate of 500-2,000 rpm for 20 min-2 h to form a Pickering emulsion, the temperature is raised to 30-60° C. for carrying out reaction for 4-10 h.

According to a preferred embodiment of the present disclosure, the present disclosure provides a method of preparing a double-chamber microcapsule for drilling fluid comprising:

Step 1: adding 30-50 parts of paraffin wax and 10-30 parts of a curing agent into a first solvent and mixing uniformly, then raising the temperature to 70-110° C., adding 10-50 parts of a solid acid or 10-50 parts of solid alkali and subjecting to an ultrasonic dispersion for 30 min to 2 h, filtering out the solid after the cooling process, washing the solid for many times and then drying the solid in vacuum, grinding and pulverizing the solid, using the pulverized solid as a solid acid or a solid alkali, and repeating the aforesaid step for 0-4 times to obtain a pre-encapsulated solid acid or a pre-encapsulated solid alkali;

Step 2: dispersing 10-30 parts of a thermo-sensitive polymer in 100-300 parts of water phase, dropwise adding 10-40 parts of a pre-encapsulated solid alkali, and performing the ultrasonic dispersion for 30 min-2 h, dialyzing the mixture with deionized water for many times and subsequently filtering and separating the mixture with molecular sieves for 3-6 h, performing freeze-drying to obtain thermo-sensitive polymer nanoparticles encapsulated with solid acid;

Step 3: adding 0.1-2 parts of an initiator, 0.01-2 parts of a catalyst, 0.1-3 parts of a complexing agent and 0.1-10 parts of an initiator monomer into 100-300 parts of a second solvent, introducing nitrogen gas and removing oxygen gas, increasing the temperature to 60-100° C. and carrying out reaction for 6-8 hours, subsequently performing rotary evaporation to remove the solvent, precipitating and filtering process to obtain a macroinitiator;

Step 4: adding 3-10 parts of the macroinitiator, 0.01-2 parts of the catalyst, 0.1-4 parts of the complexing agent, 5-30 parts of a pH responsive monomer, 1-8 parts of a cross-linking monomer and 5-20 parts of a pre-encapsulated solid alkali into 100-300 parts of an oil phase, then raising the temperature to 30-60° C. and performing reaction for 0.5-2 hours, to obtain a prepolymer mixed solution encapsulated with solid alkali;

Step 5: adding 50-150 parts of thermo-sensitive polymer nanoparticles encapsulated with solid acid into the prepolymer mixed solution encapsulated with solid alkali under the condition of a stirring rate of 500 rpm to 2,000 rpm, and performing ultrasonic emulsification for 20 min to 2 h to form a Pickering emulsion, raising the temperature to 30-60° C. and carrying out reaction for 4-10 h, filtering the product and washing sequentially with deionized water and methanol for many times, performing a rotary evaporation to obtain a double-chamber microcapsule with pH-responsive capsule core encapsulated with alkali and thermo-sensitive capsule wall encapsulated with acid.

According to another preferred embodiment of the present disclosure, the present disclosure provided a method of preparing a double-chamber microcapsule for drilling fluid comprising:

Step 1: adding 30-50 parts of paraffin wax and 10-30 parts of a curing agent into a first solvent and mixing uniformly, then raising the temperature to 70-110° C., adding 10-50 parts of a solid acid or 10-50 parts of solid alkali and subjecting to an ultrasonic dispersion for 30 min to 2 h, filtering out the solid after the cooling process, washing the solid for many times and then drying the solid in vacuum, grinding and pulverizing the solid, using the pulverized solid as a solid acid or a solid alkali, and repeating the aforesaid step for 0-4 times to obtain a pre-encapsulated solid acid or a pre-encapsulated solid alkali;

Step 2: dispersing 10-30 parts of a thermo-sensitive polymer in 100-300 parts of water phase, dropwise adding 10-40 parts of a pre-encapsulated solid alkali, and performing the ultrasonic dispersion for 30 min-2 h, dialyzing the mixture with deionized water for many times and subsequently filtering and separating the mixture with molecular sieves for 3-6 h, performing freeze-drying to obtain thermo-sensitive polymer nanoparticles encapsulated with solid alkali;

Step 3: adding 0.1-2 parts of an initiator, 0.01-2 parts of a catalyst, 0.1-3 parts of a complexing agent and 0.1-10 parts of an initiator monomer into 100-300 parts of a second solvent, introducing nitrogen gas and removing oxygen gas, increasing the temperature to 60-100° C. and carrying out reaction for 6-8 hours, subsequently performing rotary evaporation to remove the solvent, precipitating and filtering process to obtain a macroinitiator;

Step 4: adding 3-10 parts of the macroinitiator, 0.01-2 parts of the catalyst, 0.1-4 parts of the complexing agent, 5-30 parts of a pH responsive monomer, 1-8 parts of a cross-linking monomer and 5-20 parts of a pre-encapsulated solid acid into 100-300 parts of an oil phase, then raising the temperature to 30-60° C. and performing reaction for 0.5-2 hours, to obtain a prepolymer mixed solution encapsulated with solid acid;

Step 5: adding 50-150 parts of thermo-sensitive polymer nanoparticles encapsulated with solid alkali into the prepolymer mixed solution encapsulated with solid acid under the condition of a stirring rate of 500 rpm to 2,000 rpm, and performing ultrasonic emulsification for 20 min to 2 h to form a Pickering emulsion, raising the temperature to 30-60° C. and carrying out reaction for 4-10 h, filtering the product and washing sequentially with deionized water and methanol for many times, performing a rotary evaporation to obtain a double-chamber microcapsule with pH-responsive capsule core encapsulated with acid and thermo-sensitive capsule wall encapsulated with alkali.

A third aspect of the present disclosure provides a double-chamber microcapsule for drilling fluid prepared with the aforementioned method.

A fourth aspect of the present disclosure provides a self-reversing reversible water-in-oil drilling fluid comprising the aforementioned double-chamber microcapsule.

According to the present disclosure, the water-in-oil drilling fluid comprises:
- 35-70 parts by weight of an oil phase;
- 30-65 parts by weight of an aqueous phase;
- 2-12 parts by weight of a double-chamber microcapsule.

In accordance with the present disclosure, the water-in-oil drilling fluid may further comprise the following ingredients in parts by weight:
- 2-8 parts by weight of a reversible emulsifier;
- 0.5-5 parts by weight of a co-emulsifier;
- 0.1-5 parts by weight of an organic soil;
- 0.5-6 parts by weight of a filtrate reducer;
- 0.1-3 parts by weight of an alkalinity regulator;
- 0.1-5 parts by weight of a wetting agent;
- 1-6 parts by weight of a shear strength improving agent;
- 0-1,000 parts by weight of a weighting material.

According to the present disclosure, the oil phase comprises at least one of diesel, white oil, gas-to-liquid fuel (GTL), aviation kerosene, palm oil and alpha-olefins.

According to the present disclosure, the aqueous phase or water phase is an aqueous solution of calcium chloride with a mass percentage concentration of 0% to 30%.

According to the present disclosure, the reversible emulsifier is one or more selected from the group consisting of fatty acyl polyamine and a derivative thereof, lauroyl polyethylene polyamine, lauroyl dimethylamine, oleamide polyethylene polyamine, palmitoyl polyethylene polyamine, erucylamidodimethylamine, N,N'-bis lauroyl ethylenediamine, N,N-bis dodecyl-1-dodecylamine and fatty alcohol polyoxyethylene ether.

According to the present disclosure, the co-emulsifier is one or more selected from the group consisting of the Span compounds such as diethanolamine oleate dehydrated sorbitoyl monopalmitate, triethanolamine oleate dehydrated sorbitoyl monopalmitate, monoethanolamine oleate dehydrated sorbitoyl monopalmitate; the Brij compounds such as polyoxyethylene lauryl ether; Tween compounds; AEO compounds; OP compounds; betaines such as glycerol diphosphenyl betaine, laurylamide propyl hydroxyl sulfonic betaine, and N,N-dihydroxyethyl-N-ethyl fatty acid ester betaine; N-ethyl fatty acid ester-N,N-bis (2-hydroxyethyl)-3-(2-hydroxypropyl) sulfate ammonium salt, and N-acyl ethylenediamine triacetate.

According to the present disclosure, the organic soil is a quaternization product of montmorillonite.

In accordance with the present disclosure, the filtrate reducer is one or more selected from the group consisting of an oil soluble resin, a sulfonated asphalt, a modified sulfonated asphalt, an oxidized asphalt, a modified oxidized asphalt, a humic acid amide and an oil soluble polymer filtrate reducer.

According to the present disclosure, the alkalinity regulator is calcium oxide and/or magnesium oxide.

According to the present disclosure, the wetting agent is a surfactant selected from the group consisting of ethoxylated fatty acid methyl ester, sulfosuccinic acid mono-ester disodium salt, coconut oil fatty acid diethanolamide, sulfosuccinic acid mono-ester disodium salt, lecithin, imidazoline amphoteric surfactant, decyne glycol surfactant, polyether silicone copolymer, dodecyne glycol polyoxyethylene ether and dodecyne glycol polyether.

According to the present disclosure, the shear strength improving agent is an oil-soluble polymer shear strength improving agent, in particular a condensation copolymer of a polyol, an amino alcohol and a polycarboxylic acid, or a copolymer of a polyol, an amino alcohol and a polyamine, or a copolymer of a polyol, an amino alcohol and an isocyanate. Preferably, the shear strength improving agent is SRRH-O-HVis shear strength improving agent for oil-based drilling fluid (Shaanxi Senrui Petroleum Technology Development Co., Ltd.), HIRHEO oil-based shear strength improving agent (Jingzhou Jiahua Technology Co., Ltd.), SF 653 modified polyacid shear strength improving agent (Shanghai Longquan Chemical Co., Ltd.); hexadecyl methacrylate-styrene-divinylbenzene) multipolymer, (dimeric fatty acid-diethylene triamine-diethanolamine) multipolymer, or (dimeric fatty acid-triethylene tetramine-C12-C22 fatty acid diethanolamide) multipolymer.

According to the present disclosure, the weighting material is at least one of barite, calcium carbonate and hematite.

According to a preferred embodiment of the present disclosure, the present disclosure provides a method of preparing the high temperature resistance and high density self-reversing reversible water-in-oil drilling fluid comprising:

adding a reversible emulsifier and a co-emulsifier into an oil phase according to the matching ratio and stirring at a stirring rate of 10,000-12,000 rpm for 10-20 min, adding an organic soil and stirring for 10-20 min, adding an aqueous phase and stirring at 10,000-12,000 rpm and performing emulsification for 30-60 min; further adding an alkalinity regulator, a filtrate reducer, a wetting agent and a shear strength improving agent and stirring at 10,000-12,000 rpm for 10-40 min; adding a weighting material and continuously stirring for 10-30 min, and finally adding a double-chamber microcapsule.

In the aforesaid method, the double-chamber microcapsule may be added either before or after aging of the drilling fluid following the addition of a weighting material.

In a fifth aspect, the present disclosure provides a method of preparing the self-reversing reversible water-in-oil drilling fluid comprising:

adding a double-chamber microcapsule containing a solid alkali as the content of a first chamber into a drilling fluid, performing a temperature rise treatment, the nanometer thermo-sensitive polymer nanoparticles at a surface of the double-chamber microcapsule release solid acid, which automatically adjusts a pH of the emulsion to a range of 1-7, the emulsion is reversed to an oil-in-water drilling fluid; further subjecting the drilling fluid to a stirring treatment, the capsule core of the double-chamber microcapsule releases the solid alkali, the emulsion is reversed to a water-in-oil drilling fluid;

and/or, adding the double-chamber microcapsule containing a solid acid as the content of a first chamber into a drilling fluid, performing a temperature rise treatment, the nanometer thermo-sensitive polymer nanoparticles at a surface of the double-chamber microcapsule release solid alkali, which automatically adjusts a pH of the emulsion to a range of 6-12, the emulsion is reversed to a water-in-oil drilling fluid; further subjecting the drilling fluid to a stirring treatment, the capsule core of the double-chamber microcapsule releases the solid acid, the emulsion is reversed to an oil-in-water drilling fluid.

According to another preferred embodiment of the present disclosure, the present disclosure provides a reversion method of a high temperature resistance and high density self-inverting reversible water-in-oil drilling fluid, the double-chamber microcapsule is added after aging of the drilling fluid, the reversion method specifically comprises the following steps:

In a first mode, adding the prepared double-chamber microcapsule with the content of a first chamber being a solid alkali (a double-chamber microcapsule with a pH responsive capsule core encapsulating an alkali and a thermo-sensitive capsule wall encapsulating an acid) into a drilling fluid, stirring at 5,000-12,000 rpm for 1 min-1 h, and then raising the temperature to 50-100° C., the nanometer thermo-sensitive polymer nanoparticles at a surface of the double-chamber microcapsule release the solid acid, which automatically adjusts a pH of the emulsion to a range of 1-7, the HLB value of the reversible emulsifier increases, the emulsion is reversed to an oil-in-water drilling fluid; the drilling fluid is continuously stirred at 5,000-12,000 rpm for 1 min-1 h, the capsule core of the microcapsule releases the solid alkali, the lipophilicity of the emulsifier molecules increases, so that the emulsion is reversed to a water-in-oil drilling fluid;

In a second mode, adding the prepared double-chamber microcapsule with a pH responsive capsule core encapsulating an acid and a thermo-sensitive capsule wall encapsulating an alkali into a drilling fluid, stirring at 5,000-12,000 rpm for 1 min-1 h, and then raising the temperature to 50-100° C., the nanometer thermo-sensitive polymer nanoparticles at a surface of the double-chamber microcapsule release the solid alkali, which automatically adjusts a pH of the emulsion to a range of 6-12, the emulsion is reversed to a water-in-oil drilling fluid; the drilling fluid is continuously stirred at 5,000-12,000 rpm for 1 min-1 h, the capsule core of the microcapsule releases the solid acid, the hydrophilicity of the emulsifier molecules increases, so that the emulsion is reversed to an oil-in-water drilling fluid;

The high temperature resistance and high density self-reversing reversible water-in-oil drilling fluid of the present disclosure has the following favorable effects:

Firstly, the double-chamber microcapsule of the present disclosure has a simple and controllable reversion method, can delay reversing of the drilling fluid for a certain time period. The preparation method of double-chamber microcapsule is simple, the microcapsule can control the extended release time of the capsule core by initially controlling the temperature and releasing the acid/alkali. It is also possible to release the capsule core first by using a small amount of acid/alkali and then adjusting the temperature to release the acid/alkali encapsulated in the Pickering nanometer emulsifier. The safety of the direct use of an acid or alkali during storage is greatly improved, and the corrosion of the tubular wall and vessel by strong acid and alkali is alleviated.

Secondly, the double-chamber microcapsule of the present disclosure is preset in the drilling fluid and participates the formation of the filter cakes, it is conducive to maintaining stability of the borehole wall during the process of disposing downward and controlling the completion string. At a subsequent stage, the slow release of capsule core can remove the filter cakes and alleviate plugging, can effectively avoids the formation of lost circulation bands caused by alleviating plugging with a strong acid and dissolution of pores resulting from local acid etching, and lost circulation of the subsequent cleaning fluid. The time period for the delayed removal of the filter cakes is greater than 8 hours, the time required for complete reversal is less than 40 minutes, the complete removal efficiency of filter cakes is greater than 96%.

Thirdly, the drilling fluid of the present disclosure has a directly adjustable density within a range of 1.0 g/cm$^3$ to 2.2 g/cm$^3$, exhibits desirable rheology within a temperature range of 100-180° C., and has a low filtrate loss and a desired suspension stability, and the sedimentation of a weighting material and the demulsification phenomenon do not occur. The temperature controlled self-reversing drilling fluid of the present disclosure has good stability, a demulsification voltage greater than 400V, and a continuous phase extraction rate lower than 10%; the high temperature aging does not affect smooth reversal of the emulsion and stabilization of the emulsion; the drilling fluid can be reversed into an oil-in-water drilling fluids by using an acid/alkali response, a demulsification voltage is within a range of 0V to 20V, the water-in-oil drilling fluid and the oil-in-water drilling fluid have comparable properties, the high temperature and high pressure filtrate loss amounts is less than 10 mL. The drilling fluid has the properties of multiple reversibility and the reversal at a delayed and controllable time.

Fourthly, the temperature control drilling fluid of the present disclosure has an useful effect of delaying the reversal by controlling the capsule wall composition, facilitating self-reversal of the drilling fluid within the wellbore. The reversible phases of the emulsion in different borehole horizons are achieved by taking advantage of the temperature conditions within the wellbore.

In the following Examples and Comparative Examples:

Among the reversible emulsifiers, the fatty acyl polyamine and its derivatives are described in the China patent CN201811104237.9, such as oleic acid-polyethylene polyamine-phenylenediamine-maleic anhydride condensation polymer, tall oil fatty acid-divinyltriamine-phenylenediamine-maleic anhydride condensation polymer.

In the description of the present disclosure, it should be noted that if the specific conditions are not specified in the Examples, the Examples are performed either in accordance with conventional conditions or according to the conditions suggested by the manufacturers. If the manufactures of the reagents or instruments in use are not indicated, each pertains to conventional products which are commercially available.

The preferred embodiments of the present disclosure are described below, it should be understood that the preferred embodiments described herein are only used for illustrating and explaining the present disclosure, instead of limiting the present disclosure.

Example 1

The Example provided a method of preparing a double-chamber microcapsule for drilling fluid, the method comprising:

1. 50 parts of 70 #paraffin wax, 20 parts of ethyl cellulose and 3 parts of organosilicon epoxy resin were added to 200 parts of cyclohexane, the temperature was raised to 70° C., 20 parts of solid hydrochloric acid/solid potassium hydroxide having a particle size of 50 nm-1 μm were added into the solution, and subjected to the ultrasonic dispersion for 30 min, then rapidly cooled down to 10-20° C., the layered solution was filtered, and rinsed with cyclohexane for three times, then subjected to vacuum drying at 20° C. for 10 h, subsequently ground and pulverized to obtain a pre-encapsulated solid acid or a pre-encapsulated solid alkali.

2. 10 parts of PNIPAM particles were dispersed in 100 parts of deionized water to obtain a dispersion liquid, 10 parts of a pre-encapsulated solid acid was dropwise added, and then subjected to ultrasonic dispersion for 30 min, and finally dialysed with deionized water for 3 times, and subjected to filtration separation with molecular sieves for 3 h, and subjected to freeze-drying to obtain thermo-sensitive polymer nanoparticles encapsulated with solid acid.

3. 100 parts of a mixed solvent of methanol/acetone at a mixing ratio of 1:1 were sequentially added with 0.1 part of an initiator 1-PECl (1-chloro-1-phenylethane), 0.01 parts of a catalyst cuprous chloride CuCl, 0.4 part of a complexing agent PMDETA, 4 parts of a monomer tBA, the nitrogen gas was introduced for removing oxygen gas, the temperature was raised to 100° C. and the reaction was performed for 6 h, the rotary evaporation was carried out to remove solvent and unreacted raw materials, n-hexane was used for precipitating to obtain the macroinitiator.

4. 3 parts of macroinitiator, 0.01 parts of cuprous chloride CuCl, 0.4 part of a complexing agent N,N',N'',N''-pentamethyldiethylenetriamine, 10 parts of monomer DMAEMA, 3 parts of HDDA, 10 parts of pre-encapsulated solid alkali were added into 100 parts of dodecyl oil phase, the temperature was raised to 30° C. and the reaction was performed for 0.5 h, obtained a prepolymer mixed solution encapsulated with solid alkali.

5. 100 parts of thermo-sensitive polymer nanoparticle solution encapsulated with solid acid was dropwise added to the prepolymer mixed solution encapsulated with solid alkali under the condition of stirring at a high speed of 1,000 rpm, the ultrasonic emulsification was performed for 20 min to form a Pickering emulsion, the temperature was raised to 30° C. and the reaction was performed for 8 h, the reaction product was washed with deionized water and methanol sequentially for 3 times, the rotary evaporation was performed to remove solvent and unreacted raw materials;

the double-chamber microcapsule was obtained, the double-chamber microcapsule was composed of a capsule core and a microcapsule wall encapsulating the capsule core, the content of a second chamber was encapsulated in the microcapsule wall, the content of a first chamber was encapsulated in the capsule core.

Wherein the content of a first chamber was a solid alkali potassium hydroxide, and the content of a second chamber was solid acid hydrochloric acid;

The microcapsule wall was composed of thermo-sensitive polymer nanoparticles encapsulating the solid acid, the microcapsule wall had a thickness within the range of 200 nm and 500 nm, and an average thickness of 350 nm;

The capsule core was a pH responsive polymer encapsulating the solid alkali, the capsule core had a thickness within the range of 300 nm and 800 nm, and an average thickness of 550 nm;

In addition, a weight ratio of the capsule core to the microcapsule wall was 68:32.

The effects of temperature on the granularity and zeta potential of the double-chamber microcapsule were tested by using the laser particle size method, the results were shown in FIG. 1. As illustrated in FIG. 1, the change in particle size of the microcapsule increased from 330 nm to 520 nm along with a temperature rise, and the change in particle size was the largest within the temperature range of 50-60° C. Moreover, the temperature rise caused that the microcapsule wall was swollen by the solid acid released therefrom, the solid alkali of the double-chamber microcapsule capsule core was finally released, the zeta potential of the microcapsule decreased.

Figure 2:
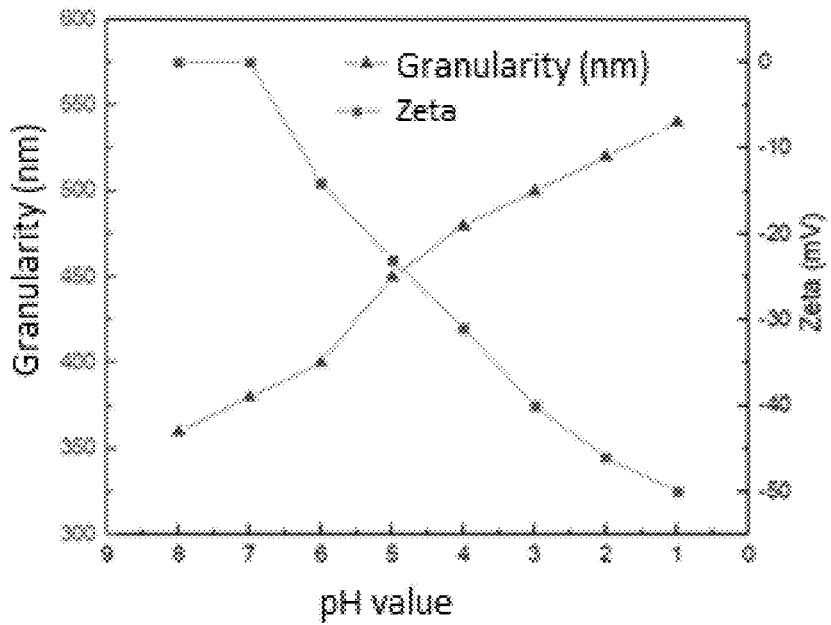
FIG. 2 illustrates an influence curve showing the effect of pH on the granularity and zeta potential of the double-chamber microcapsule in Example 1 of the present disclosure.

The effects of pH on the granularity and zeta potential of the double-chamber microcapsule was tested by using the laser particle size method, the results were shown in FIG. 2. As illustrated in FIG. 2, along with the decrease of the pH, the double-chamber microcapsule was swollen to release the solid alkali of the double-chamber microcapsule capsule core, the Zeta potential was continuously lowered, and the particle size of the microcapsule was increased.

The molecular weight and distribution of the double-chamber microcapsule were tested by using the gel permeation chromatography (GPC), the results of the GPC molecular weight and molecular weight distribution of the double-chamber microcapsule in Example 1 were shown in Table 1. Examples 2-5 had the similar results.

TABLE 1

| Mn (Dalton) | Mw (Dalton) | Mp | Mz (Dalton) | Mz + 1 (Dalton) | Polydispersity |
|---|---|---|---|---|---|
| 53654 | 67843 | 70126 | 78651 | 84265 | 1.26 |

As illustrated by the data in Table 1, the double-chamber microcapsule had a moderate molecular weight and a relatively narrow distribution of molecular weight.

The encapsulation ratio of the microcapsule was denoted as a ratio of the encapsulated capsule core to the total amount of the capsule core fed in the process of preparing the microcapsule. The higher was the encapsulation ratio, the more was the encapsulated capsule core, the better effect was produced by the preparation process of microcapsule. The encapsulation ratio of the double-chamber microcapsule was tested by using the mass difference method, the results of the pre-encapsulated solid acid/alkali, the thermo-sensitive polymer, the encapsulation ratio of double-chamber microcapsule of Example 1 were shown in Table 2. Examples 2-5 had the similar results.

TABLE 2

| Samples | Pre-encapsulated solid acid | Pre-encapsulated solid alkali | Thermo-sensitive polymer nanoparticles of solid acid | Double-chamber microcapsule |
|---|---|---|---|---|
| Encapsulation ratio (%) | 82.83 | 81.21 | 71.66 | 70.56 |

Each of the pre-encapsulated solid acid/alkali, the thermo-sensitive polymer nanoparticles, and the double-chamber microcapsule had an encapsulation ratio more than 70%, the encapsulation ratio was high.

Figure 3:
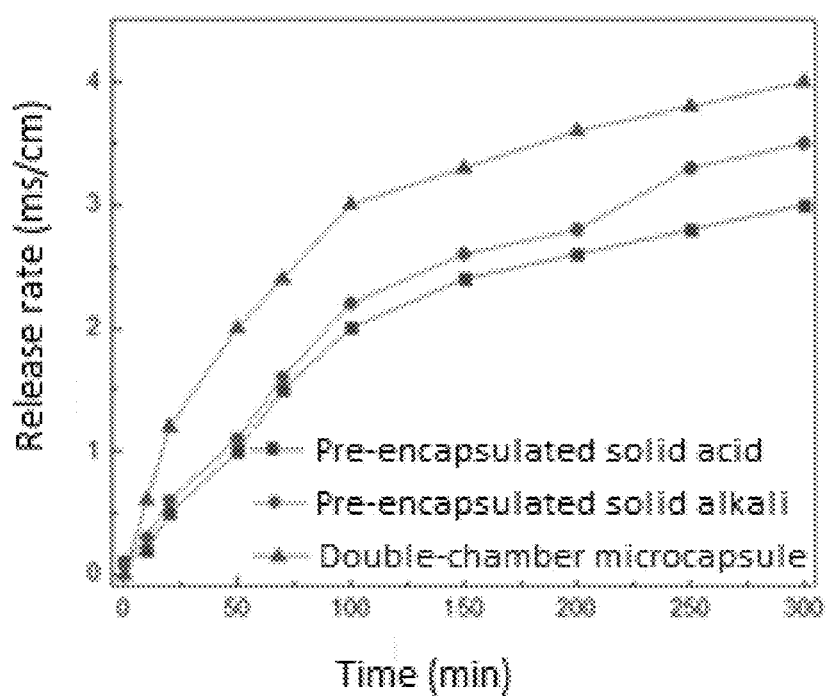
FIG. 3 is a graph illustrating the release efficiency of a double-chamber microcapsule in Example 1 of the present disclosure.

The release efficiency of the pre-encapsulated solid acid/alkali, double-chamber microcapsule was further observed, the release efficiency was measured by using a method of recording the change in electrical conductivity over time, the results were shown in FIG. 3. The release rate of the pre-encapsulated solid acid/alkali was placid, it demonstrated a high encapsulation rate, which was conducive to retarding the release rate of the acid and/or alkali. The high release rate of the double-chamber microcapsule facilitated the rapid release of the capsule core (pre-encapsulated solid acid/alkali) from the double-chamber microcapsule wall.

Figure 4:
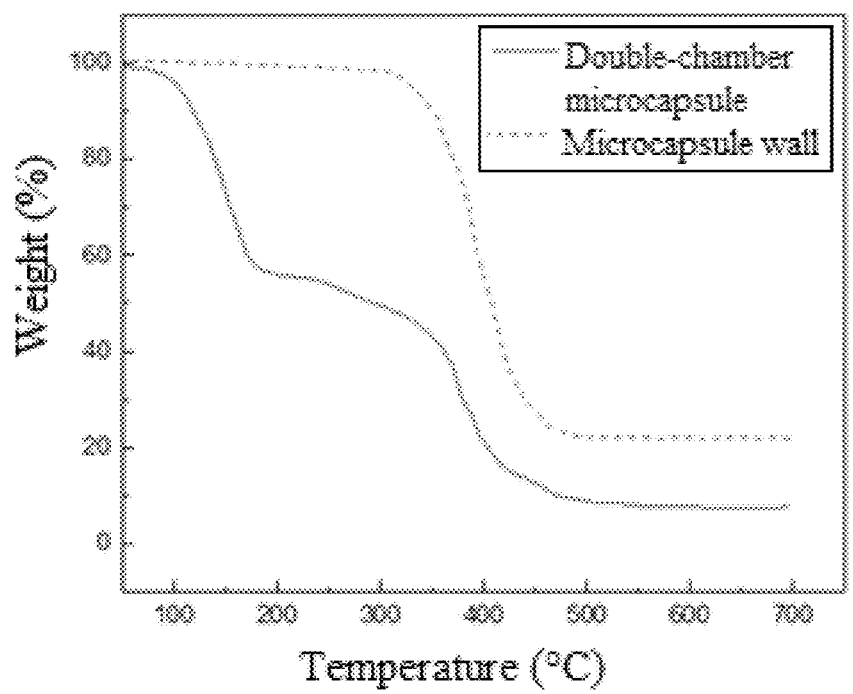
FIG. 4 illustrates a thermal weight loss curve of a double-chamber microcapsule in Example 1 of the present disclosure.

The example also examined the results of thermal weight loss from both the double-chamber microcapsule and the microcapsule wall without adding the solid acid and solid alkali, the thermogravimetric analyzer—the Mettler-Toledo multithermogravity and a synchronous thermal analyzer was used, the results were shown in FIG. 4. As illustrated in FIG. 4, the microcapsule wall without adding the solid acid and solid alkali only had one thermal weight loss, while the microcapsule wall encapsulated with the solid acid and solid alkali had two thermal weight losses, the thermal degradation within the temperature of 200° C. was due to the solid acid and/or solid alkali released from the capsule core.

Figure 5:
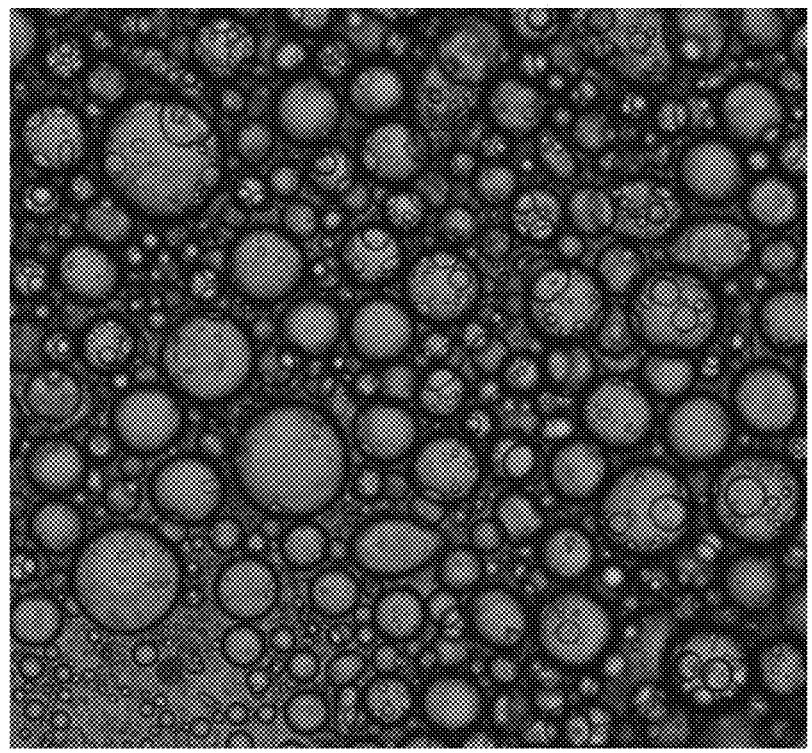
FIG. 5 is an optical microscopic image of a Pickering emulsion in step 5 in Example 1 of the present disclosure.

In addition, the optical microscopy of the Pickering emulsion in step 5 of the present disclosure was shown in FIG. 5, the particle size was within a range of 1-10 μm, the emulsion was relatively uniform, and the particle size distribution was narrower.

Example 2

The Example provided a method of preparing a double-chamber microcapsule for drilling fluid, the method comprising:

1. 40 parts of 85 #EVA wax and 10 parts of polystyrene were added into 100 parts of toluene and heated to 100° C., 30 parts of solid nitric acid/solid sodium hydroxide with a particle size of 50 nm-1 μm were added to the solution, and subjected to the ultrasonic dispersion for 50 min, then rapidly cooled down to 30° C., the layered solution was filtered, and rinsed with methylbenzene for three times, then subjected to vacuum drying at 30° C. for 10 h, subsequently ground and pulverized to obtain a pre-encapsulated solid acid or a pre-encapsulated solid alkali.

2. 30 parts of poly(2-carboxy-N-isopropylamide) were dispersed in 100 parts of deionized water to obtain a dispersion liquid, 20 parts of a pre-encapsulated solid acid was dropwise added, and then subjected to ultrasonic dispersion for 30 min, and finally dialysed with deionized water for 3 times, and subjected to filtration separation with molecular sieves for 4 h, and subjected to freeze-drying to obtain thermo-sensitive polymer nanoparticles encapsulated with solid acid.

3. 1 part of an initiator 2-bromoisobutyryl bromide, 0.07 part of a catalyst CuBr$_2$, 1 part of a complexing agent 2'2-bipyridine and 5 parts of monomer methyl acrylate were sequentially added into 100 parts of tetrahydrofuran solvent, the nitrogen gas was introduced for removing oxygen gas, the temperature was raised to 100° C. and the reaction was performed for 6 h, the rotary evaporation was carried out to remove solvent and unreacted raw materials, n-hexane was used for precipitating to obtain the macroinitiator.

4. 5 parts of the macroinitiator, 0.1 part of catalyst CuBr$_2$, 1 part of a complexing agent 2 2-bipyridine, 5 parts of monomer N'N-dimethylaminoethyl methacrylate, 1 part of 1,6-hexanediol diacrylate, 5 parts of a pre-encapsulated solid alkali, the temperature was raised to 30° C. and the reaction was performed for 1 h, obtained a prepolymer mixed solution encapsulated with solid alkali.

5. 50 parts of thermo-sensitive polymer nanoparticle solution encapsulated with solid acid was dropwise added to the prepolymer mixed solution encapsulated with solid alkali under the condition of stirring at a high speed of 1,000 rpm, the ultrasonic emulsification was performed for 1 h to form a Pickering emulsion, the temperature was raised to 50° C. and the reaction was performed for 10 h, the reaction product was washed with deionized water and methanol sequentially for 3 times, the rotary evaporation was performed to remove solvent and unreacted raw materials;

The double-chamber microcapsule was obtained, the double-chamber microcapsule was composed of a capsule core and a microcapsule wall encapsulating the capsule core, the content of a second chamber was encapsulated in the microcapsule wall, the content of a first chamber was encapsulated in the capsule core.

Wherein the content of a first chamber was a solid alkali sodium hydroxide, and the content of a second chamber was solid acid nitric acid;

The microcapsule wall was composed of thermo-sensitive polymer nanoparticles encapsulating the solid acid, the microcapsule wall had a thickness within the range of 660 nm and 10 μm, and an average thickness of 2 μm;

The capsule core was a pH responsive polymer encapsulating the solid alkali, the capsule core had a thickness within the range of 100 nm and 50 μm, and an average thickness of 25 μm;

In addition, a weight ratio of the capsule core to the microcapsule wall was 73:27.

The results of GPC molecular weight and distribution and the encapsulation ratio were shown in Table 3, which illustrated the GPC molecular weight and molecular weight of the double-chamber microcapsule of the Example respectively; Table 4 showed the pre-encapsulated solid acid/alkali, thermo-sensitive polymer, encapsulation ratio of double-chamber microcapsule of the Example.

TABLE 3

| Mn (Dalton) | Mw (Dalton) | Mp | Mz (Dalton) | Mz + 1 (Dalton) | Polydispersity |
|---|---|---|---|---|---|
| 39881 | 45415 | 48126 | 50144 | 53214 | 1.14 |

As illustrated by the data in Table 3, the double-chamber microcapsule had a moderate molecular weight and a relatively narrow distribution of molecular weight.

TABLE 4

| Samples | Pre-encapsulated solid acid | Pre-encapsulated solid alkali | Thermo-sensitive polymer nanoparticles of solid acid | Double-chamber microcapsule |
|---|---|---|---|---|
| Encapsulation ratio (%) | 88.21 | 87.16 | 75.61 | 77.23 |

The data in Table 4 showed that each of the pre-encapsulated solid acid/alkali, the thermo-sensitive polymer nanoparticles, and the double-chamber microcapsule had an encapsulation ratio more than 75%, the encapsulation ratio was high. Moreover, the rate curve pattern of release of the pre-encapsulated solid acid/alkali from the double-chamber microcapsule of Example 2 was the same as that of Example 1.

Example 3

The Example provided a method of preparing a double-chamber microcapsule for drilling fluid, the method comprising:

1. 50 parts of 80 #paraffin wax, 10 parts of melamine formaldehyde resin were added into 100 parts of cyclohexane and heated to 80° C., 10 parts of solid phosphoric acid/solid potassium hydroxide having a particle size of 50 nm-1 μm were added into the solution, and subjected to the ultrasonic dispersion for 1 h, then rapidly cooled down to 10° C., the layered solution was filtered, and rinsed with cyclohexane for three times, then subjected to vacuum drying for 10 h, subsequently ground and pulverized to obtain a pre-encapsulated solid acid or a pre-encapsulated solid alkali. The pre-encapsulated solid acid/alkali was used as the solid acid or solid alkali, and the aforesaid steps were repeated for twice.

2. 10 parts of Poly (N-isopropylacrylamide) (PNIPAM) particles and 10 parts of poly(2-carboxy-N-isopropylamide) were dispersed in 100 parts of deionized water to obtain a dispersion liquid, 20 parts of a pre-encapsulated solid acid was dropwise added, and then subjected to ultrasonic dispersion for 2 h, and finally dialysed with deionized water for 3 times, and subjected to filtration separation with molecular sieves for 6 h, and subjected to freeze-drying to obtain thermo-sensitive polymer nanoparticles encapsulated with solid acid.

3. 1 part of ethyl 2-(2-bromoisobutoxy)methacrylate, 0.5 part of a catalyst $CuI_2$, 0.6 part of a complexing agent 1,1,4,7,10,10-hexamethyltriethylenetetramine, 10 parts of monomer 4-vinylbenzene polyacid were added sequentially into 100 parts of a mixed solvent of isopropanol/acetone at a mixing ration of 1:0.5, the nitrogen gas was introduced for removing oxygen gas, the temperature was raised to 60° C. and the reaction was performed for 8 h, the rotary evaporation was carried out to remove solvent and unreacted raw materials, n-hexane was used for precipitating to obtain the macroinitiator.

4. 10 parts of the macroinitiator, 0.05 part of cuprous iodide CuI, 0.6 part of a complexing agent 1,1,4,7,10,10-hexamethyltriethylenetetramine, 14 parts of monomer N'N-dimethylaminoethyl methacrylate, 2 parts of acrylic acid, 3 parts of trimethylolpropane trimethacrylate, 20 parts of pre-encapsulated solid alkali were added into 100 parts of n-hexane, the temperature was raised to 30° C. and the reaction was performed for 0.5 h, obtained a prepolymer mixed solution encapsulated with solid alkali.

5. 150 parts of thermo-sensitive polymer nanoparticle solution encapsulated with solid acid was dropwise added to the prepolymer mixed solution encapsulated with solid alkali under the condition of stirring at a high speed of 1,000 rpm, the ultrasonic emulsification was performed for 30 min to form a Pickering emulsion, the temperature was raised to 30° C. and the reaction was performed for 4 h, the reaction product was washed with deionized water and methanol sequentially for 3 times, the rotary evaporation was performed to remove solvent and unreacted raw materials;

The double-chamber microcapsule was obtained, the double-chamber microcapsule was composed of a capsule core and a microcapsule wall encapsulating the capsule core, the content of a second chamber was encapsulated in the microcapsule wall, the content of a first chamber was encapsulated in the capsule core.

Wherein the content of a first chamber was a solid alkali potassium hydroxide, and the content of a second chamber was solid acid phosphoric acid;

The microcapsule wall was composed of thermo-sensitive polymer nanoparticles encapsulating the solid acid, the microcapsule wall had a thickness within the range of 3 μm and 100 μm, and an average thickness of 51.5 μm;

The capsule core was a pH responsive polymer encapsulating the solid alkali, the capsule core had a thickness within the range of 50 μm and 300 μm, and an average thickness of 175 μm;

In addition, a weight ratio of the capsule core to the microcapsule wall was 71:29.

The results of GPC molecular weight and distribution and the encapsulation ratio were shown in Table 5, which illustrated the GPC molecular weight and molecular weight of the double-chamber microcapsule of the Example respectively; Table 6 showed the pre-encapsulated solid acid/alkali, thermo-sensitive polymer, encapsulation ratio of double-chamber microcapsule of the Example.

TABLE 5

| Mn (Dalton) | Mw (Dalton) | Mp | Mz (Dalton) | Mz + 1 (Dalton) | Polydispersity |
|---|---|---|---|---|---|
| 74881 | 78954 | 81026 | 82265 | 86617 | 1.05 |

As illustrated by the data in Table 5, the double-chamber microcapsule had a moderate molecular weight and a relatively narrow distribution of molecular weight.

TABLE 6

| Samples | Pre-encapsulated solid acid | Pre-encapsulated solid alkali | Thermo-sensitive polymer nanoparticles of solid acid | Double-chamber microcapsule |
|---|---|---|---|---|
| Encapsulation ratio (%) | 79.62 | 81.21 | 77.36 | 74.62 |

The data in Table 6 showed that each of the pre-encapsulated solid acid/alkali, the thermo-sensitive polymer nanoparticles, and the double-chamber microcapsule had an encapsulation ratio more than 74%, the encapsulation ratio was high. Moreover, the rate curve pattern of release of the pre-encapsulated solid acid/alkali from the double-chamber microcapsule of Example 3 was the same as that of Example 1.

Example 4

The Example provided a method of preparing a double-chamber microcapsule for drilling fluid, the method comprising:

1. 30 parts of polyethylene wax, 20 parts of ethyl cellulose, 5 parts of polyurethane were added into 100 parts of toluene and heated to 100° C., 50 parts solid sulfonic acid/solid potassium hydroxide having a particle size of 50 nm to 1 μm were added into the solution, and subjected to the ultrasonic dispersion for 2 h, then rapidly cooled down to 40° C., the layered solution was filtered, and rinsed with toluene for three times, then subjected to vacuum drying at 40° C. for 10 h, subsequently ground and pulverized to obtain a pre-encapsulated solid acid or a pre-encapsulated solid alkali. The pre-encapsulated solid acid/alkali was used as the solid acid or solid alkali, and the aforesaid steps were repeated for four times.

2. 30 parts of poly(N,N-diethyl acrylamide) were dispersed in 100 parts of deionized water to obtain a dispersion liquid, 30 parts of a pre-encapsulated solid alkali were dropwise added, and then subjected to ultrasonic dispersion for 1 h, and dialysed with deionized water for 3 times, and subjected to filtration separation with molecular sieves for 6 h, and subjected to freeze-drying to obtain thermo-sensitive polymer nanoparticles encapsulated with solid alkali.

3. 2 parts of an initiator ethyl 2-(2-bromopropionyloxy) acrylate, 1 part of a catalyst $CuCl_2$, 3 parts of a complexing agent 2-pyridinecarboxaldehyde n-propylamine, 20 parts of monomer 2-succinyloxyethyl methacrylate were added sequentially into 100 parts of a mixed solvent of methanol/diethyl ether at a mixing ration of 1:1, the nitrogen gas was introduced for removing oxygen gas, the temperature was raised to 60° C. and the reaction was performed for 8 h, the rotary evaporation was carried out to remove solvent and unreacted raw materials, n-hexane was used for precipitating to obtain the macroinitiator.

4. 4 parts of the macroinitiator, 1 part of CuCl$_2$, 4 parts of a complexing agent 2-pyridine-formaldehyde n-propylamine, 10 parts of pH responsive monomemer N'N-dimethyl-aminoethyl methacrylate, 20 parts of acrylic acid, 4 parts of isodecyl acrylate IDA and 10 parts of pre-encapsulated solid acid were added into 100 parts of n-heptane, the temperature was raised to 60° C. and the reaction was performed for 2 h, obtained a prepolymer mixed solution encapsulated with solid acid.

5. 100 parts of thermo-sensitive polymer nanoparticle solution encapsulated with solid alkali was dropwise added to the prepolymer mixed solution encapsulated with solid alkali under the condition of stirring at a high speed of 1,000 rpm, the ultrasonic emulsification was performed for 20 min to form a Pickering emulsion, the temperature was raised to 60° C. and the reaction was performed for 8 h, the reaction product was washed with deionized water and methanol sequentially for 3 times, the rotary evaporation was performed to remove solvent and unreacted raw materials;

The double-chamber microcapsule was obtained, the double-chamber microcapsule was composed of a capsule core and a microcapsule wall encapsulating the capsule core, the content of a second chamber was encapsulated in the microcapsule wall, the content of a first chamber was encapsulated in the capsule core.

Wherein the content of a first chamber was a solid acid sulfonic acid, and the content of a second chamber was solid alkali potassium hydroxide;

The microcapsule wall was composed of thermo-sensitive polymer nanoparticles encapsulating the solid alkali, the microcapsule wall had a thickness within the range of 200 μm and 800 μm, and an average thickness of 500 μm;

The capsule core was a pH responsive polymer encapsulating the solid alkali, the capsule core had a thickness within the range of 500 μm and 0.1 cm, and an average thickness of 900 μm;

In addition, a weight ratio of the capsule core to the microcapsule wall was 63.8:36.2.

The results of GPC molecular weight and distribution and the encapsulation ratio were shown in Table 7, which illustrated the GPC molecular weight and molecular weight of the double-chamber microcapsule of the Example respectively; Table 8 showed the pre-encapsulated solid acid/alkali, thermo-sensitive polymer, encapsulation ratio of double-chamber microcapsule of the Example.

TABLE 7

| Mn (Dalton) | Mw (Dalton) | Mp | Mz (Dalton) | Mz + 1 (Dalton) | Polydispersity |
| --- | --- | --- | --- | --- | --- |
| 83214 | 89851 | 91041 | 93154 | 99416 | 1.08 |

As illustrated by the data in Table 7, the double-chamber microcapsule had a moderate molecular weight and a relatively narrow distribution of molecular weight.

TABLE 8

| Samples | Pre-encapsulated solid acid | Pre-encapsulated solid alkali | Thermo-sensitive polymer nanoparticles of solid acid | Double-chamber microcapsule |
| --- | --- | --- | --- | --- |
| Encapsulation ratio (%) | 80.21 | 81.35 | 78.32 | 76.19 |

The data in Table 8 showed that each of the pre-encapsulated solid acid/alkali, the thermo-sensitive polymer nanoparticles, and the double-chamber microcapsule had an encapsulation ratio more than 76%, the encapsulation ratio was high. Moreover, the rate curve pattern of release of the pre-encapsulated solid acid/alkali from the double-chamber microcapsule of Example 4 was the same as that of Example 1.

Example 5

The Example provided a method of preparing a double-chamber microcapsule for drilling fluid, the method comprising:

1. 30 parts of PP wax, 120 parts of ethyl cellulose, 6 parts of acrylic resin were added into 100 parts of toluene and heated to 110° C., 40 parts of oxalic acid/solid lithium hydroxide with a particle size of 50 nm-1 μm were added into the solution, and subjected to the ultrasonic dispersion for 60 min, then rapidly cooled down to 20-30° C., the layered solution was filtered, and rinsed with cyclohexane for three times, then subjected to vacuum drying at 20° C. for 6 h, subsequently ground and pulverized to obtain a pre-encapsulated solid acid or a pre-encapsulated solid alkali. The pre-encapsulated solid acid/alkali was used as the solid acid or solid alkali, and the aforesaid steps were repeated for three times.

2. 20 parts of PNIPAM particles were dispersed in 100 parts of deionized water to obtain a dispersion liquid, 10 parts of a pre-encapsulated solid alkali were dropwise added, and then subjected to ultrasonic dispersion for 1 h, and dialysed with deionized water for 3 times, and subjected to filtration separation with molecular sieves for 3 h, and subjected to freeze-drying to obtain thermo-sensitive polymer nanoparticles encapsulated with solid alkali.

3. 0.5 part of an initiator 2-(2-bromopropionyloxy)-ethyl acrylate, 2 parts of the catalyst cuprous chloride CuCl, 1 part of a complexing agent 1,1,4,7,10,10-hexamethyltriethyl-enetetramine, 20 parts of monomer tert-butyl acrylate were added sequentially into 100 parts of a mixed solvent of methanol/isopropanol at a mixing ration of 1:1, the nitrogen gas was introduced for removing oxygen gas, the temperature was raised to 60° C. and the reaction was performed for 7 h, the rotary evaporation was carried out to remove solvent and unreacted raw materials, n-hexane was used for precipitating to obtain the macroinitiator.

4. 8 parts of the macroinitiator, 2 parts of cuprous chloride CuCl, 2 parts of a complexing agent 2-pyridine carboxaldehyde n-propylamine, 8 parts of monomer N'N-dimethyl-amine propyl methacrylamide, 17 parts of methacrylic acid, 5 parts of HDDA and 3 parts of lauric acid acrylate and 20 parts of pre-encapsulated solid acid were added into 100 parts of cyclopentane, the temperature was raised to 50° C. and the reaction was performed for 0.5 h, so that a prepolymer mixed solution encapsulated with solid acid was obtained.

5. 120 parts of thermo-sensitive polymer nanoparticle solution encapsulated with solid alkali was dropwise added to the prepolymer mixed solution encapsulated with solid acid under the condition of stirring at a high speed of 1,000 rpm, the ultrasonic emulsification was performed for 2 h to form a Pickering emulsion, the temperature was raised to 50° C. and the reaction was performed for 8 h, the reaction product was washed with deionized water and methanol sequentially for 3 times, the rotary evaporation was performed to remove solvent and unreacted raw materials;

The double-chamber microcapsule was obtained, the double-chamber microcapsule was composed of a capsule core and a microcapsule wall encapsulating the capsule core, the content of a second chamber was encapsulated in the microcapsule wall, the content of a first chamber was encapsulated in the capsule core.

Wherein the content of a first chamber was a solid acid oxalic acid, and the content of a second chamber was solid alkali lithium hydroxide;

The microcapsule wall was composed of thermo-sensitive polymer nanoparticles encapsulating the solid alkali, the microcapsule wall had a thickness within the range of 500 μm and 0.1 cm, and an average thickness of 800 μm;

The capsule core was a pH responsive polymer encapsulating the solid acid, the capsule core had a thickness within the range of 800 μm and 0.5 cm, and an average thickness of 1,000 μm;

In addition, a weight ratio of the capsule core to the microcapsule wall was 68:32.

The results of GPC molecular weight and distribution and the encapsulation ratio were shown in Table 9, which illustrated the GPC molecular weight and molecular weight of the double-chamber microcapsule of the Example respectively; Table 10 showed the pre-encapsulated solid acid/ alkali, thermo-sensitive polymer, encapsulation ratio of double-chamber microcapsule of the Example.

TABLE 9

| Mn (Dalton) | Mw (Dalton) | Mp | Mz (Dalton) | Mz + 1 (Dalton) | Polydispersity |
|---|---|---|---|---|---|
| 98214 | 101154 | 113671 | 125841 | 145571 | 1.03 |

As illustrated by the data in Table 9, the double-chamber microcapsule had a moderate molecular weight and a relatively narrow distribution of molecular weight.

TABLE 10

| Samples | Pre-encapsulated solid acid | Pre-encapsulated solid alkali | Thermo-sensitive polymer nanoparticles of solid acid | Double-chamber microcapsule |
|---|---|---|---|---|
| Encapsulation ratio (%) | 83.21 | 81.29 | 76.36 | 75.14 |

The data in Table 10 showed that each of the pre-encapsulated solid acid/alkali, the thermo-sensitive polymer nanoparticles, and the double-chamber microcapsule had an encapsulation ratio more than 70%, the encapsulation ratio was high. Moreover, the rate curve pattern of release of the pre-encapsulated solid acid/alkali from the double-chamber microcapsule of Example 5 was the same as that of Example 1.

Examples 6-13 illustrated the method of preparing a high temperature resistance and high density temperature controlled self-reversing drilling fluid.

Example 6

The example provided a method of preparing a high temperature resistance and high density self-reversing reversible water-in-oil drilling fluid, the method comprising: 3 parts of a reversible emulsifier N,N-didodecyl-1-do-decylamine and 1 part of a co-emulsifier Brij35 were sequentially added into 50 parts of diesel oil, the mixture was stirred at 12,000 rpm for 20 min, 1 part of a quaternization product of organic soil montmorillonite was added and stirred for 10 min, 50 parts of an aqueous calcium chloride solution having a mass fraction of 30% was further added and stirred at 12,000 rpm for 30 min; 1 part of an alkalinity regulator calcium oxide, 5 parts of a filtrate reducer humic acid amide, 2 parts of a wetting agent ethoxylated fatty acid methyl ester, 1 part of a shear strength improving agent (dimer fatty acid-divinyl triamine-diethanolamine)multi-polymer were added in sequence, and stirred at a high velocity of 12,000 rpm for 20 min after adding each of the treating agents. A weighting agent barite was then added to adjust the drilling fluid density to 1.2 g/cm$^3$ and stirred for 30 min. Finally, 3 parts of the double-chamber microcapsule (Example 1) were added, and stirred for 20 min.

Example 7

The example provided a method of preparing a high temperature resistance and high density self-reversing reversible water-in-oil drilling fluid, the method comprising: 4 parts of a reversible emulsifier oleoylpolyethylene polyamine and 2 parts of a co-emulsifier glycerodiphosphinobetaine were sequentially added into 60 parts of GTL, stirred at 12,000 rpm for 20 min, 1 part of a quaternization product of organic soil montmorillonite was added and stirred for 10 min, 40 parts of an aqueous calcium chloride solution having a mass fraction of 30% was further added and stirred at 12,000 rpm for 30 min; 2 parts of an alkalinity regulator calcium oxide, 4 parts of a filtrate reducer oxidized asphalt, 3 parts of a wetting agent decynediol, 5 parts of a shear strength improving agent (i.e., SRRH-O-HVis shear strength improving agent for oil-based drilling fluid) were added in sequence, and stirred at a high velocity of 12,000 rpm for 20 min after adding each of the treating agents. A weighting agent barite was then added to adjust the drilling fluid density to 1.6 g/cm$^3$ and stirred for 30 min. Finally, 5 parts of the double-chamber microcapsule (Example 2) were added, and stirred for 20 min.

Example 8

The Example provided a method of preparing a high temperature resistance and high density self-reversing reversible water-in-oil drilling fluid, the method comprising: 50 parts of the reversible emulsifier palmitoyl polyethylene polyamine, 3 parts of the co-emulsifier N-ethyl fatty acid ester-N,N-bis(2-hydroxyethyl)-3-(2-hydroxypropyl) sulfate ammonium salt were added sequentially into 50 parts of alpha-olefin and stirred at 12,000 rpm for 20 min; 3 parts of quaternization product of organic soil montmorillonite was added and stirred for 20 min, 50 parts of an aqueous calcium chloride solution having a mass fraction of 20% was further added and stirred at 12,000 rpm for 30 min; 1.5 parts of an alkalinity regulator magnesium oxide, 2 parts of a filtrate reducer (octadecyldimethylallylammonium chloride-styrene-dodecyl methacrylate-acrylic acid) polymer, 3 parts a wetting agent polyether siloxane and 3 parts of the SF 653 modified polyacid shear strength improving agent were added in sequence, and stirred at a high velocity of 12,000 rpm for 20 min after adding each of the treating agents. A weighting agent barite was then added to adjust the drilling fluid density to 1.8 g/cm$^3$ and stirred for 30 min. Finally, 7 parts of the double-chamber microcapsule (Example 3) were added, and stirred for 20 min.

Example 9

The Example provided a method of preparing a high temperature resistance and high density self-reversing reversible water-in-oil drilling fluid, the method comprising: 6 parts of the reversible emulsifier oleic acid-polyethylene polyamine-phenylene diamine-maleic anhydride polycondensate (as for its preparation method, refer to the granted patent ZL201811104237.9) and 4 parts of a co-emulsifier N-acylethylenediaminetriacetate were added sequentially to 50 parts of diesel oil, and stirred at 12,000 rpm for 20 min, 0.5 part of a quaternization product of organic soil montmorillonite was added and stirred for 10 min, 50 parts of an aqueous calcium chloride solution having a mass fraction of 30% was further added and stirred at 12,000 rpm for 30 min; 3 parts of an alkalinity regulator calcium oxide, 3 parts of a filtrate reducer oxidized asphalt, 3 parts of a wetting agent dodecynediol polyether and 6 parts of a shear strength improving agent—HIRHEO oil-based shear strength improving agent were added in sequence, and stirred at a high velocity of 12,000 rpm for 20 min after adding each of the treating agents. A weighting agent barite was then added to adjust the drilling fluid density to 2.0 g/cm$^3$ and stirred for 30 min. Finally, 10 parts of the double-chamber microcapsule (Example 1) were added, and stirred for 20 min.

Example 10

The Example provided a method of preparing a high temperature resistance and high density self-reversing reversible water-in-oil drilling fluid, the method comprising: 8 parts of the reversible emulsifier tall oil fatty acid-divinyl triamine-phenylenediamine-maleic anhydride polycondensate (as for the preparation method, refer to the granted patent ZL201811104237.9) and 4 parts of a co-emulsifier triethanolamine oleate sorbitan monopalmitate were sequentially added into 55 parts of white oil, and stirred at 12,000 rpm for 20 min; 2 parts of a quaternization product of organic soil montmorillonite was added and stirred for 15 min, 45 parts of an aqueous calcium chloride solution having a mass fraction of 30% was further added and stirred at 12,000 rpm for 30 min; 1 part of an alkalinity regulator calcium oxide, 4 parts of a filtrate reducer (vinyl decanoate-triallyl cyanurate-styrene) terpolymer filtrate reducer, 5 parts of a wetting agent dodecynediol polyoxyethylene ether, 4 parts of a shear strength improving agent (hexadecyl methacrylate-styrene-divinylbenzene) multipolymer were added in sequence, and stirred at a high velocity of 12,000 rpm for 20 min after adding each of the treating agents. A weighting agent barite was then added to adjust the drilling fluid density to 2.2 g/cm$^3$ and stirred for 30 min. Finally, 12 parts of the double-chamber microcapsule (Example 2) were added, and stirred for 20 min.

Example 11

The Example provided a method of preparing a high temperature resistance and high density self-reversing reversible water-in-oil drilling fluid, the method comprising: 4 parts of a reversible emulsifier N,N-didodecyl-1-dodecylamine and 2 parts of a co-emulsifier lauramide propoxy sulfobetaine were sequentially added into 40 parts of palm oil, and stirred at 12,000 rpm for 20 min, 3 parts of a quaternization product of organic soil montmorillonite was added and stirred for 20 min, 60 parts of an aqueous solution were added and stirred at 12,000 rpm for 30 min, 0.5 part of the alkalinity regulator calcium oxide, 3 parts of the filtrate reducer (cetyl dimethyl acrylamine chloride-divinylbenzene-dodecyl methacrylate-maleic anhydride) copolymer, 0.5 part of a wetting agent lecithin, 2 parts of a shear strength improving agent (dimer fatty acid-divinyltriamine-diethanolamine) multipolymer were added in sequence, and stirred at a high velocity of 12,000 rpm for 20 min after adding each of the treating agents. A weighting agent barite was then added to adjust the drilling fluid density to 1.4 g/cm$^3$ and stirred for 30 min. Finally, 5 parts of the double-chamber microcapsule (Example 4) were added, and stirred for 20 min.

Example 12

The Example provided a method of preparing a high temperature resistance and high density self-reversing reversible water-in-oil drilling fluid, the method comprising: 5 parts of a reversible emulsifier lauroyl polyethylene polyamine and 2 parts of a co-emulsifier fatty alcohol polyoxyethylene ether (AEO) were sequentially added into 45 parts of aviation kerosene, and stirred at 12,000 rpm for 20 min; 2.5 parts of a quaternization product of organic soil montmorillonite was added and stirred for 10 min, 55 parts of an aqueous calcium chloride solution having a mass fraction of 30% was further added and stirred at 12,000 rpm for 30 min; 2 parts of an alkalinity regulator calcium oxide, 4 parts of a filtrate reducer humic acid amide, 3 parts of a wetting agent sulfosuccinate monoester disodium salt, 4 parts of a shear strength improving agent (dimer fatty acid-triethylene tetramine-$C_{12}$-$C_{22}$ fatty acid diethanolamide) multi-polymer were added in sequence, and stirred at a high velocity of 12,000 rpm for 20 min after adding each of the treating agents. A weighting agent barite was then added to adjust the drilling fluid density to 1.8 g/cm$^3$ and stirred for 30 min. Finally, 8 parts of the double-chamber microcapsule (Example 5) were added, and stirred for 20 min.

Example 13

The example provided a method of preparing a high temperature resistance and high density self-reversing reversible water-in-oil drilling fluid, the method comprising: 6 parts of a reversible emulsifier lauramide dimethylamine and 5 parts of a co-emulsifier SP80 were sequentially added into 50 parts of diesel oil, and stirred at 12,000 rpm for 20 min; 3 parts of a quaternization product of organic soil montmorillonite was added and stirred for 10 min, 50 parts of an aqueous calcium chloride solution having a mass fraction of 30% was further added and stirred at 12,000 rpm for 30 min; 2 parts of an alkalinity regulator calcium oxide, 6 parts of a filtrate reducer modified sulfonated asphalt, 4 parts of a wetting agent coconut oil fatty acid diethanolamide, 5 parts of a shear strength improving agent (hexadecyl methacrylate-styrene-divinylbenzene) multipolymer were added in sequence, and stirred at a high velocity of 12,000 rpm for 20 min after adding each of the treating agents. A weighting agent barite was then added to adjust the drilling fluid density to 2.0 g/cm$^3$ and stirred for 30 min. Finally, 10 parts of the double-chamber microcapsule (Example 2) were added, and stirred for 20 min.

Example 14

The Example provided a method of preparing a high temperature resistance and high density self-reversing reversible water-in-oil drilling fluid, the method comprising:

2 parts of a reversible emulsifier erucamide dimethylamine and 0.5 part of a co-emulsifier Tween60 were sequentially added into 35 parts of diesel oil, and stirred at 12,000 rpm for 20 min; 5 parts of a quaternization product of organic soil montmorillonite was added and stirred for 10 min, 65 parts of an aqueous calcium chloride solution having a mass fraction of 30% was further added and stirred at 12,000 rpm for 30 min; 0.1 part of an alkalinity regulator calcium oxide, 0.5 part of a filtrate reducer oil soluble resin OFC (Shandong Deshunyuan Petroleum Technology Co., Ltd.), 0.1 part of a wetting agent sulfosuccinate monoester disodium salt, 1 part of the shear strength improving agent (i.e., SRRH-O-HVis shear strength improving agent for oil-based drilling fluid) were added in sequence, and stirred at a high velocity of 12,000 rpm for 20 min after adding each of the treating agents. A weighting agent barite was then added to adjust the drilling fluid density to 1.0 g/cm$^3$ and stirred for 30 min. Finally, 2 parts of the double-chamber microcapsule (Example 4) were added, and stirred for 20 min.

Example 15

The Example provided a method of preparing a high temperature resistance and high density self-reversing reversible water-in-oil drilling fluid, the method comprising: 5 parts of a reversible emulsifier N,N'-dilauroyl ethylenediamine and 3 parts of a co-emulsifier OP-10 were sequentially added into 70 parts of diesel oil, and stirred at 12,000 rpm for 20 min; 3 parts of a quaternization product of organic soil montmorillonite was added and stirred for 10 min, 30 parts of an aqueous calcium chloride solution having a mass fraction of 15% was further added and stirred at 12,000 rpm for 30 min; 3 parts of an alkalinity regulator calcium oxide, 3 parts of a filtrate reducer sulfonated asphalt, 1 part of a wetting agent ethoxylated fatty acid methyl ester, 3 parts of a shear strength improving agent HIRHEO oil-based shear strength improving agent (Jingzhou Jiahua Technology Co., Ltd.) were added in sequence, and stirred at a high velocity of 12,000 rpm for 20 min after adding each of the treating agents. A weighting agent barite was then added to adjust the drilling fluid density to 1.2 g/cm$^3$ and stirred for 30 min. Finally, 6 parts of the double-chamber microcapsule (Example 1) were added, and stirred for 20 min.

Comparative Example 1

The Comparative Example provided a method of preparing drilling fluid, which differed from Example 10 in that the double-chamber microcapsule was not added.

Comparative Example 2

The Comparative Example provided a method of preparing drilling fluid, which differed from Example 13 in that the double-chamber microcapsule was not added.

Comparative Example 3

The Comparative Example provided a method of preparing the drilling fluid in the existing art, the method comprising: 4 parts of an emulsifier tall oil fatty acid and 5 parts of a co-emulsifier Span80 were sequentially added into 70 parts of diesel oil, and stirred at 12,000 rpm for 20 min; 3 parts of organic soil, and 30 parts of an aqueous calcium chloride solution having a mass fraction of 30% were further added and stirred at 12,000 rpm for 30-40 min; 2 parts of an alkalinity regulator calcium oxide, 6 parts of a filtrate reducer humic acid amide, 2 parts of a wetting agent lecithin, 3 parts of a shear strength improving agent HIRHEO oil-based shear strength improving agent (Jingzhou Jiahua Technology Co., Ltd.) were added in sequence, and stirred at a high velocity for 20 min after adding each of the treating agents. A weighting agent was then added to adjust the drilling fluid density to 2.2 g/cm$^3$ and stirred for 30 min.

Experiments and Tests

The test standards of the drilling fluid were specified in the National Standard GB/T 16783.2-2012 of China, namely "Petroleum and natural gas industries—Field testing of drilling fluids—Part 2: Oil-based fluids".

1) A drilling fluid was prepared according to the method in Example 6, after high temperature aging at 120° C. for 16 h, the double-chamber microcapsule was added, the measured properties of the drilling fluid were indicated by Table 11 below, namely the reversal performance of the high temperature resistance and high density self-reversing drilling fluid of Example 6.

TABLE 11

| Temperature/° C. | Type | ES | AV | PV | PY | $G_{10s}/G_{10min}$ | $FL_{HTHP}$/mL | 48 h continuous phase precipitation ratio/% | pH of filtrate | Reversal time |
| --- | --- | --- | --- | --- | --- | --- | --- | --- | --- | --- |
| 30 | W/O | 487 | 56 | 45 | 11 | 2.5/3 | 2.4 | 0 | 8 | — |
| 60 | O/W | 10 | 60 | 50 | 10 | 2/2.5 | 2.8 | 1.8 | 6.2 | 20 min |
| 60 | W/O | 472 | 58.5 | 46 | 12.5 | 2/2.5 | 3.6 | 2.1 | 7.5 | 6 h |

The reversible emulsified drilling fluid had a density of 1.2 g/cm$^3$, the temperature was raised from 30° C. to 60° C., the thermo-sensitive polymer nanoparticles at a surface of the double-chamber microcapsule released solid acid, which stimulated the emulsifier molecules in the emulsion to increase its hydrophilicity, the emulsion was reversed to an oil-in-water emulsion. The reversion time was 20 minutes and the reversion process was rapid. The double-chamber microcapsule was exposed to acidic conditions, the microcapsule slowly released solid alkali, the lipophilicity of the emulsifier molecules was enhanced, the emulsion was reversed to a water-in-oil drilling fluid, the time required for the second stage self-reversal was 6 hours.

2) A drilling fluid was prepared with the method in Example 7, after high temperature aging at 150° C. for 16 h, the double-chamber microcapsule was added, the measured properties of the drilling fluid were indicated by Table 12 below, namely the reversal performance of the high temperature resistance and high density self-reversing drilling fluid of Example 7.

TABLE 12

| Temperature/ °C. | Type | ES | AV | PV | PY | $G_{10s}/G_{10min}$ | $FL_{HTHP}$/mL | 48 h continuous phase precipitation ratio/% | pH of filtrate | Reversal time |
|---|---|---|---|---|---|---|---|---|---|---|
| 30 | W/O | 493 | 69 | 56 | 13 | 2/2.5 | 2.2 | 1.6 | 8 | — |
| 80 | O/W | 10 | 73 | 60 | 13 | 2/2.5 | 2.8 | 2.1 | 5 | 30 min |
| 80 | W/O | 511 | 70.5 | 58 | 12.5 | 2/3 | 3.2 | 2.7 | 7.2 | 8 h |

The reversible emulsified drilling fluid had a density of 1.6 g/cm³, the temperature was raised from 30° C. to 80° C., the thermo-sensitive polymer nanoparticles at a surface of the double-chamber microcapsule released solid acid, which stimulated the emulsifier molecules in the emulsion to increase its hydrophilicity, the emulsion was reversed to an oil-in-water emulsion. The reversion time was 30 minutes and the reversion process was rapid. The double-chamber microcapsule was exposed to acidic conditions, the microcapsule slowly released solid alkali, the lipophilicity of the emulsifier molecules was enhanced, the emulsion was reversed to a water-in-oil drilling fluid, the time required for the second stage self-reversal was 8 hours.

3) A drilling fluid was prepared with the method in Example 8, after high temperature aging at 180° C. for 16 h, the double-chamber microcapsule was added, the measured properties of the drilling fluid were indicated by Table 13 below, namely the reversal performance of the high temperature resistance and high density self-reversing drilling fluid of Example 8.

TABLE 13

| Temperature/ °C. | Type | ES | AV | PV | PY | $G_{10s}/G_{10min}$ | $FL_{HTHP}$/mL | 48 h continuous phase precipitation ratio/% | pH of filtrate | Reversal time |
|---|---|---|---|---|---|---|---|---|---|---|
| 20 | W/O | 528 | 89 | 70 | 19 | 3/4 | 3.2 | 4.2 | 8 | — |
| 70 | O/W | 10 | 87.5 | 70 | 17.5 | 3/3.5 | 3.8 | 5.3 | 5.5 | 1 h |
| 70 | W/O | 517 | 91.5 | 76 | 15.5 | 3/4 | 4.4 | 6.1 | 7.5 | 10 h |

The reversible emulsified drilling fluid had a density of 1.8 g/cm³, the temperature was raised from 20° C. to 70° C., the thermo-sensitive polymer nanoparticles at a surface of the double-chamber microcapsule released solid acid, which stimulated the emulsifier molecules in the emulsion to increase its hydrophilicity, the emulsion was reversed to an oil-in-water emulsion. The reversion time was 1 hour and the reversion process was rapid. The double-chamber microcapsule was exposed to acidic conditions, the microcapsule slowly released solid alkali, the lipophilicity of the emulsifier molecules was enhanced, the emulsion was reversed to a water-in-oil drilling fluid, the time required for the second stage self-reversal was 10 hours.

4) A drilling fluid was prepared with the method in Example 9, after high temperature aging at 180° C. for 16 h, the double-chamber microcapsule was added, the measured properties of the drilling fluid were indicated by Table 14 below, namely the reversal performance of the high temperature resistance and high density self-reversing drilling fluid of Example 9.

TABLE 14

| Temperature/ °C. | Type | ES | AV | PV | PY | $G_{10s}/G_{10min}$ | $FL_{HTHP}$/mL | 48 h continuous phase precipitation ratio/% | pH of filtrate | Reversal time |
|---|---|---|---|---|---|---|---|---|---|---|
| 30 | W/O | 536 | 97 | 78 | 19 | 4/4.5 | 5.2 | 4.9 | 8 | — |
| 90 | O/W | 10 | 102.5 | 87 | 15.5 | 4/5 | 6.0 | 5.5 | 5.8 | 2 h |
| 90 | W/O | 510 | 98.5 | 80 | 18.5 | 4/4.5 | 5.2 | 5.9 | 6 | 12 h |

The reversible emulsified drilling fluid had a density of 2.0 g/cm³, the temperature was raised from 30° C. to 90° C., the thermo-sensitive polymer nanoparticles at a surface of the double-chamber microcapsule released solid acid, which stimulated the emulsifier molecules in the emulsion to increase its hydrophilicity, the emulsion was reversed to an oil-in-water emulsion. The reversion time was 2 hours and the reversion process was rapid. The double-chamber microcapsule was exposed to acidic conditions, the microcapsule slowly released solid alkali, the lipophilicity of the emulsifier molecules was enhanced, the emulsion was reversed to a water-in-oil drilling fluid, the time required for the second stage self-reversal was 12 hours.

5) A drilling fluid was prepared with the method in Example 10, after high temperature aging at 180° C. for 16 h, the double-chamber microcapsule was added, the measured properties of the drilling fluid were indicated by Table 15 below, namely the reversal performance of the high temperature resistance and high density self-reversing drilling fluid of Example 10.

TABLE 15

| Temperature/ °C. | Type | ES | AV | PV | PY | $G_{10s}/G_{10min}$ | $FL_{HTHP}$/mL | 48 h continuous phase precipitation ratio/% | pH of filtrate | Reversal time |
|---|---|---|---|---|---|---|---|---|---|---|
| 30 | W/O | 523 | 113 | 89 | 24 | 4/4.5 | 4.2 | 8.2 | 8 | — |
| 90 | O/W | 10 | 115.5 | 90 | 25.5 | 4/5 | 5.4 | 7.9 | 5.2 | 30 min |
| 90 | W/O | 527 | 108.5 | 85 | 23.5 | 4.5/5.5 | 5.8 | 9.6 | 6.5 | 10 h |

The reversible emulsified drilling fluid had a density of 2.2 g/cm³, the temperature was raised from 30° C. to 90° C., the thermo-sensitive polymer nanoparticles at a surface of the double-chamber microcapsule released solid acid, which stimulated the emulsifier molecules in the emulsion to increase its hydrophilicity, the emulsion was reversed to an oil-in-water emulsion. The reversion time was 30 min and the reversion process was rapid. The double-chamber microcapsule was exposed to acidic conditions, the microcapsule slowly released solid alkali, the lipophilicity of the emulsifier molecules was enhanced, the emulsion was reversed to a water-in-oil drilling fluid, the time required for the second stage self-reversal was 10 hours.

Figure 6:
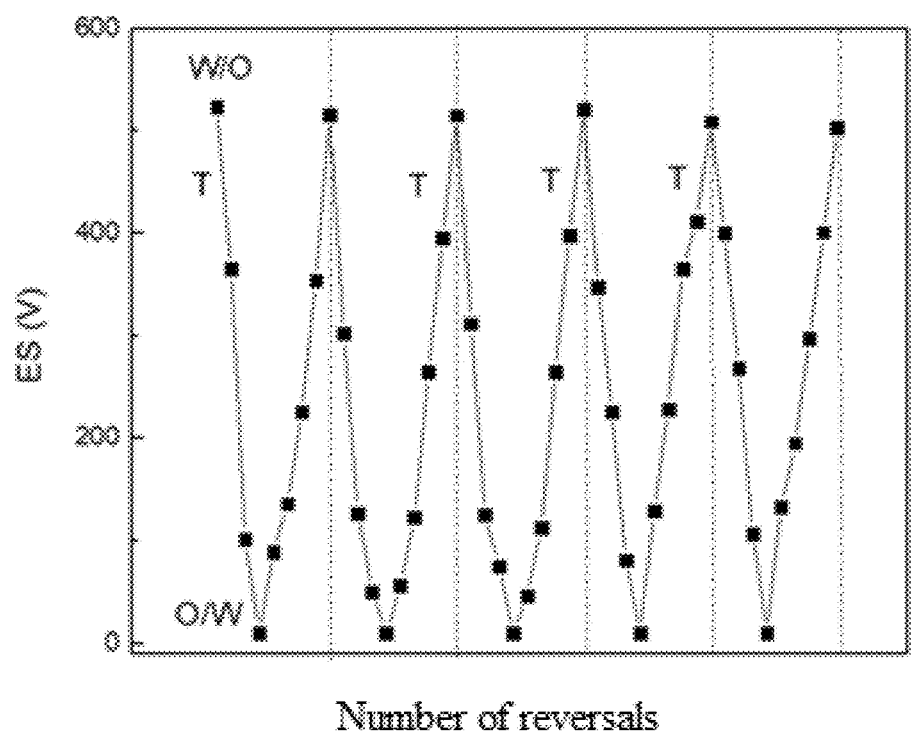
FIG. 6 illustrates a cyclic curve of the number of reversals versus ES of the drilling fluid in Example 10 of the present disclosure.

The relationship between the number of reversals with the ES cycle period was observed for the drilling fluid in Example 10 by using a method of adding the double-chamber microcapsule for many times to stimulate reversion, the results were shown in FIG. 6; the water-in-oil emulsion was reversed to an oil-in-water emulsion along with the temperature rise process, the oil-in-water emulsion was spontaneously reversed to a water-in-oil emulsion over a time period of 10 hours, the cycle period may be performed for at least six times.

A drilling fluid formulated according to the method of Example 10 was poured into a high temperature aging tank, and subjected to aging under the different aging temperature conditions, the influence of the different aging temperatures on the performance of drilling fluid was measured, the temperature resistance of drilling fluid was as shown in Table 16 below, namely the temperature resistance performance of the high temperature resistance and high density self-reversing drilling fluid of Example 10.

TABLE 16

| Processing modes | ES/V | AV/mPa·s | PV/mPa·s | YP/Pa | $G_{10s}/G_{10min}$ | $FL_{HTHP}$ mL | 48 h continuous phase precipitation ratio/% |
|---|---|---|---|---|---|---|---|
| Before aging | 493 | 103 | 84 | 19 | 3/4 | — | 7.6 |
| After aging at 100° C. | 521 | 109.5 | 86 | 23.5 | 3/3.5 | 3.0 | 7.5 |
| After aging at 120° C. | 532 | 112.5 | 89 | 23.5 | 3.5/4.5 | 3.2 | 7.9 |
| After aging at 150° C. | 536 | 121.5 | 95 | 26.5 | 3.5/4.5 | 3.6 | 8.2 |
| After aging at 180° C. | 523 | 113 | 89 | 24 | 4/4.5 | 4.2 | 8.9 |

The data in Table 16 showed that the reversible emulsified drilling fluid had similar properties and stable system rheology under different aging temperature conditions. The filtrate loss was low, the precipitation rate was low, the demulsification voltage was higher than 400V, and the emulsifying performance was excellent.

6) A drilling fluid was prepared with the method in Example 11, after high temperature aging at 150° C. for 16 h, the double-chamber microcapsule was added, the measured properties of the drilling fluid were indicated by Table 17 below, namely the reversal performance of the high temperature resistance and high density self-reversing drilling fluid of Example 11.

TABLE 17

| Temperature/ °C | Type | ES | AV | PV | PY | $G_{10s}/G_{10min}$ | $FL_{HTHP}$/mL | 48 h continuous phase precipitation ratio/% | pH of filtrate | Reversal time |
|---|---|---|---|---|---|---|---|---|---|---|
| 30 | O/W | 5 | 67.5 | 55 | 12.5 | 3/3.5 | 4.2 | 4.8 | 6 | — |
| 70 | W/O | 513 | 63 | 52 | 11 | 3/3.5 | 5.2 | 5.2 | 8 | 30 min |
| 70 | O/W | 5 | 69.5 | 57 | 12.5 | 3/4 | 5.8 | 6.0 | 5.5 | 9 h |

The reversible emulsified drilling fluid had a density of 1.4 g/cm³, the temperature was raised from 30° C. to 70° C., the thermo-sensitive polymer nanoparticles at a surface of the double-chamber microcapsule released solid alkali, which stimulated the emulsifier molecules in the emulsion to increase lipophilicity, the emulsion was reversed to an a water-in-oil drilling fluid. The reversion time was 30 min and the reversion process was rapid. The microcapsule released the solid acid, the hydrophilicity of the emulsifier molecules was enhanced, the emulsion was reversed to an oil-in-water drilling fluid, the time required for the second stage self-reversal was 9 hours.

7) A drilling fluid was prepared with the method in Example 12, after high temperature aging at 180° C. for 16 h, the double-chamber microcapsule was added, the measured properties of the drilling fluid were indicated by Table 18 below, namely the reversal performance of the high temperature resistance and high density self-reversing drilling fluid of Example 12.

TABLE 18

| Temperature/ °C | Type | ES | AV | PV | PY | $G_{10s}/G_{10min}$ | $FL_{HTHP}$/mL | 48 h continuous phase precipitation ratio/% | pH of filtrate | Reversal time |
|---|---|---|---|---|---|---|---|---|---|---|
| 30 | O/W | 5 | 84.5 | 70 | 14.5 | 3/3.5 | 5.8 | 8.2 | 6 | — |
| 95 | W/O | 522 | 80 | 67 | 13 | 3/4.0 | 4.6 | 7.5 | 7.5 | 1 h |
| 95 | O/W | 8 | 81.5 | 68 | 13.5 | 3.5/4.5 | 6.2 | 8.9 | 5.8 | 11 h |

The reversible emulsified drilling fluid had a density of 1.8 g/cm³, the temperature was raised from 30° C. to 95° C., the thermo-sensitive polymer nanoparticles at a surface of the double-chamber microcapsule released solid alkali, which stimulated the emulsifier molecules in the emulsion to increase lipophilicity, the emulsion was reversed to an a water-in-oil drilling fluid. The reversion time was 1 hour and the reversion process was rapid. The microcapsule swelled and slowly released the solid acid, the hydrophilicity of the emulsifier molecules was enhanced, the emulsion was reversed to an oil-in-water drilling fluid, the time required for the second stage self-reversal was 11 hours.

8) A drilling fluid was prepared with the method in Example 13, after high temperature aging at 150° C. for 16 h, the double-chamber microcapsule was added, the measured properties of the drilling fluid were indicated by Table 19 below, namely the reversal performance of the high temperature resistance and high density self-reversing drilling fluid of Example 13.

TABLE 19

| Temperature/ °C | Type | ES | AV | PV | PY | $G_{10s}/G_{10min}$ | $FL_{HTHP}$/mL | 48 h continuous phase precipitation ratio/% | pH of filtrate | Reversal time |
|---|---|---|---|---|---|---|---|---|---|---|
| 30 | O/W | 5 | 95 | 78 | 17 | 4/5 | 4.2 | 8.2 | 6.5 | — |
| 90 | W/O | 536 | 103 | 84 | 19 | 4/4.5 | 5.4 | 8.1 | 8 | 3 h |
| 90 | O/W | 5 | 97.5 | 80 | 17.5 | 3.5/4.5 | 6.8 | 9.3 | 6.2 | 12 h |

The reversible emulsified drilling fluid had a density of 2.0 g/cm³, the temperature was raised from 30° C. to 90° C., the thermo-sensitive polymer nanoparticles at a surface of the double-chamber microcapsule released solid alkali, which stimulated the emulsifier molecules in the emulsion to increase lipophilicity, the emulsion was reversed to an a water-in-oil drilling fluid. The reversion time was 3 hours and the reversion process was rapid. The microcapsule slowly released the solid acid, the hydrophilicity of the emulsifier molecules was enhanced, the emulsion was reversed to an oil-in-water drilling fluid, the time required for the second stage self-reversal was 12 hours.

9) A drilling fluid in the Comparative Example 1 was poured into a high temperature aging tank, and subjected to the high temperature aging at the temperature condition of 150° C. for 16 h, then added with hydrochloric acid having a mass fraction of 15% and stirred at 10,000 rpm for 30 min, or added with an alkaline solution having a mass fraction of 15% and stirred at 10,000 rpm for 30 min respectively, in order to stimulate reversion of the drilling fluid, the measured properties of the drilling fluid were indicated by Table 20 below, namely the experimental data of Comparative Example 1.

TABLE 20

| Temperature/° C. | Type | ES | AV | PV | PY | $G_{10s}/G_{10min}$ | $FL_{HTHP}$/mL | 48 h continuous phase precipitation ratio/% | pH of filtrate | Reversal time |
| --- | --- | --- | --- | --- | --- | --- | --- | --- | --- | --- |
| After aging | W/O | 435 | 105 | 89 | 16 | 3/3.5 | 5 | 9.4 | 8 | — |
| Acid solution | O/W | 10 | 135.5 | 105 | 30.5 | 6/8 | 15.6 | 22.4 | 6 | 15 min |
| Alkaline solution | W/O | 419 | 128.5 | 101 | 27.5 | 4/5.5 | 15.8 | 25.8 | 7 | 20 min |

The drilling fluid without the addition of a double-chamber microcapsule can be reversed after adding an acid solution and an alkaline solution, the time required for reversal is short, and the delayed reversal cannot be achieved. The reversal controllability was poor, the addition of an acid solution and an alkaline solution after the drilling process tended to cause inadequate reversal and destabilization, the rheology and filtrate loss performance of the drilling fluid deteriorated.

10) A drilling fluid in the Comparative Example 3 was poured into a high temperature aging tank, and subjected to the high temperature aging at the temperature condition of 150° C. for 16 h, then added with hydrochloric acid having a mass fraction of 15% and stirred at 10,000 rpm for 30 min, or added with an alkaline solution having a mass fraction of 15% and stirred at 10,000 rpm for 30 min respectively, in order to stimulate reversion of the drilling fluid, the measured properties of the drilling fluid were indicated by Table 21 below, namely the experimental data of Comparative Example 3.

TABLE 21

| Temperature/° C. | Type | ES | AV | PV | PY | $G_{10s}/G_{10min}$ | $FL_{HTHP}$/mL | 48 h continuous phase precipitation ratio/% | pH of filtrate | Reversal time |
| --- | --- | --- | --- | --- | --- | --- | --- | --- | --- | --- |
| 30 | W/O | 535 | 79 | 66 | 13 | 3/4 | 8.2 | 11.5 | 8 | — |
| Acid solution | | | | | | | Irreversible | | | |
| Alkaline solution | | | | | | | Irreversible | | | |

As for the drilling fluid without the addition of a reversible emulsifier and a double-chamber microcapsule, the drilling fluid can be reversed through adding an acid fluid and an alkali fluid.

11) The removal ratio of filter cakes were obtained by soaking the filter cakes obtained from the high temperature and high pressure filter press by using the drilling fluids of Examples 6-13 and Comparative Examples 1-3 in an acid solution having a concentration of 15%, then calculating the mass difference of the filter cakes on the filter paper before and after the soaking process. The results were shown in Table 22, namely the removal times of filter cakes in Examples 6-13.

TABLE 22

|  | Start time of removing filter cakes | Time required for complete dissolution of filter cakes | Dissolution ratio of filter cakes % |
|---|---|---|---|
| Example 6 | 8.5 h | 30 min | 96.7 |
| Example 7 | 8.2 h | 20 min | 97.6 |
| Example 8 | 10.5 h | 35 min | 97.1 |
| Example 9 | 13 h | 40 min | 96.9 |
| Example 10 | 11.5 h | 15 min | 98.3 |
| Example 11 | 9.5 h | 15 min | 99.7 |
| Example 12 | 12.2 h | 10 min | 98.3 |
| Example 13 | 12.6 h | 15 min | 97.9 |
| Example 14 | 8.5 h | 25 min | 97.3 |
| Example 15 | 8.9 h | 32 min | 96.1 |
| Comparative Example 1 | 30 min | 5 h | 87.3 |
| Comparative Example 2 | 40 min | 3 h | 86.1 |
| Comparative Example 3 | >24 h | >24 h | 54 |

The use of a double-chamber microcapsule allows the filter cakes to remain intact for a long time period, contributing to the stability of the borehole during the well completion process. The filter cakes provide a long delayed removal time, the time required for complete reversal is less than 40 minutes, and the efficiency of completely clearing the filter cakes is more than 96%. If a double-chamber microcapsule is not used, the time that the filter cakes start to dissolve is short when using an acid/alkali with a high concentration of 15%, the dissolution mainly starts from a surface of the filter cakes, the skeleton of filter cakes is then dissolved, it requires a long time to completely remove the filter cakes, and the efficiency of completely clearing the filter cakes is lower than 90%. In contrast, the efficiency of removing the drilling fluid filter cakes in common practice is poor, and the dissolution time of filter cakes is long.

The invention claimed is:

1. A double-chamber microcapsule for drilling fluid comprising a capsule core and a microcapsule wall encapsulating the capsule core, and the microcapsule wall is a thermo-sensitive polymer encapsulating the content of a second chamber; the capsule core is a pH responsive polymer encapsulating the content of a first chamber, the pH responsive polymer is obtained by polymerizing a pH responsive monomer and a cross-linking monomer;

the content of the first chamber is different from the content of the second chamber, each is selected from a solid acid or a solid alkali.

2. The double-chamber microcapsule of claim 1, wherein the microcapsule wall has a thickness within a range of 100 nm-0.5 cm, and the capsule core has a thickness within a range of 300 nm-1 cm.

3. The double-chamber microcapsule of claim 1, wherein the microcapsule wall has a thickness within a range of 20 μm-0.1 cm, the capsule core has a thickness within a range of 20 μm-0.5 cm.

4. The double-chamber microcapsule of claim 1, wherein a weight ratio of the used amount of the capsule core to the microcapsule wall is (80-30):(20-70), based on the total weight of the double-chamber microcapsule.

5. The double-chamber microcapsule of claim 4, wherein a weight ratio of the used amount of the capsule core to the microcapsule wall is (60-40):(40-60).

6. The double-chamber microcapsule of claim 1, wherein the solid acid is one or more selected from the group consisting of hydrochloric acid, nitric acid, solid oxalic acid, solid phosphoric acid and solid sulfonic acid;

and/or, the solid alkali is one or more selected from the group consisting of lithium hydroxide, sodium hydroxide and potassium hydroxide;

and/or, the thermo-sensitive polymer is one or more selected from the group consisting of poly(N-isopropylacrylamide), poly(N,N-diethylacrylamide) and poly(2-carboxy-N-isopropylamide);

and/or, the pH responsive monomer is one or more selected from the group consisting of N'N-dimethylaminoethyl methacrylate, acrylic acid and methacrylic acid;

and/or, the cross-linking monomer is one or more selected from the group consisting of isodecyl acrylate, laurate acrylate, 1,6-hexanediol diacrylate, trimethylolpropane triacrylate, ethylene glycol dimethacrylate, trimethylolpropane trimethacrylate and propylene glycol diacrylate.

7. A self-reversing reversible water-in-oil drilling fluid comprising the double-chamber microcapsule of claim 1.

8. The self-reversing reversible water-in-oil drilling fluid of claim 7, wherein the self-reversing reversible water-in-oil drilling fluid comprises:

35-70 parts by weight of an oil phase;
30-65 parts by weight of an aqueous phase;
2-12 parts by weight of a double-chamber microcapsule.

9. The self-reversing reversible water-in-oil drilling fluid of claim 7, wherein the self-reversing reversible water-in-oil drilling fluid further comprises:

2-8 parts by weight of a reversible emulsifier;
0.5-5 parts by weight of a co-emulsifier;
0.1-5 parts by weight of an organic soil;
0.5-6 parts by weight of a filtrate reducer;
0.1-3 parts by weight of an alkalinity regulator;
0.1-5 parts by weight of a wetting agent;
1-6 parts by weight of a shear strength improving agent;
0-1,000 parts by weight of a weighting material.

10. The self-reversing reversible water-in-oil drilling fluid of claim 9, wherein a method of preparing the self-reversing reversible water-in-oil drilling fluid comprising:

adding a double-chamber microcapsule containing a solid alkali as the content of a first chamber into a drilling fluid, performing a temperature rise treatment, nanometer thermo-sensitive polymer nanoparticles at a surface of the double-chamber microcapsule release the solid acid, which automatically adjusts a pH of emulsion to a range of 1-7, the emulsion is reversed to an oil-in-water drilling fluid; further subjecting the drilling fluid to a stirring treatment, the capsule core of the double-chamber microcapsule releases solid alkali, so that the emulsion is reversed to a water-in-oil drilling fluid;

and/or, adding the double-chamber microcapsule containing a solid acid as the content of a first chamber into a drilling fluid, performing a temperature rise treatment, the nanometer thermo-sensitive polymer nanoparticles at a surface of the double-chamber microcapsule release solid alkali, which automatically adjusts a pH of the emulsion to a range of 6-12, the emulsion is reversed to a water-in-oil drilling fluid; further subjecting the drilling fluid to a stirring treatment, the capsule core of the double-chamber microcapsule releases the solid acid, the emulsion is reversed to an oil-in-water drilling fluid.

* * * * *